US012567538B2

(12) United States Patent
Yamaki et al.

(10) Patent No.: US 12,567,538 B2
(45) Date of Patent: Mar. 3, 2026

(54) METHOD OF MANUFACTURING A DUST CORE AND THE DUST CORE

(71) Applicant: TOKIN CORPORATION, Shiroishi (JP)

(72) Inventors: Makoto Yamaki, Sendai (JP); Naoto Onishi, Sendai (JP); Akiri Urata, Sendai (JP)

(73) Assignee: TOKIN CORPORATION, Shiroishi (JP)

( * ) Notice: Subject to any disclaimer, the term of this patent is extended or adjusted under 35 U.S.C. 154(b) by 381 days.

(21) Appl. No.: 18/028,667

(22) PCT Filed: Sep. 28, 2021

(86) PCT No.: PCT/JP2021/035565
§ 371 (c)(1),
(2) Date: Mar. 27, 2023

(87) PCT Pub. No.: WO2022/071290
PCT Pub. Date: Apr. 7, 2022

(65) Prior Publication Data
US 2024/0029951 A1 Jan. 25, 2024

(30) Foreign Application Priority Data
Sep. 30, 2020 (JP) ................................ 2020-164976

(51) Int. Cl.
*H01F 41/02* (2006.01)
*H01F 1/153* (2006.01)
*H01F 1/24* (2006.01)

(52) U.S. Cl.
CPC ......... *H01F 41/0246* (2013.01); *H01F 1/153* (2013.01); *H01F 1/24* (2013.01)

(58) Field of Classification Search
CPC ........ H01F 41/0246; H01F 1/153; H01F 1/24; H01F 1/15333; H01F 1/15375;
(Continued)

(56) References Cited

U.S. PATENT DOCUMENTS

2018/0169759 A1* 6/2018 Nakamura ................ B22F 3/00
2018/0281061 A1* 10/2018 Kako ...................... H01F 41/02
(Continued)

FOREIGN PATENT DOCUMENTS

JP H03188202 A 8/1991
JP H04162503 A 6/1992
(Continued)

OTHER PUBLICATIONS

JP-2017188677-A: Espacenet English machine translation (Year: 2017).*
(Continued)

*Primary Examiner* — Adil A. Siddiqui
(74) *Attorney, Agent, or Firm* — Holtz, Holtz & Volek PC

(57) ABSTRACT

A dust core is manufactured by compacting magnetic particles in a metal die while heating the magnetic particles at a predetermined temperature in the metal die. At least some of the magnetic particles are coated with coating material. The metal die comprises a die, an upper punch and a lower punch. The upper punch is positioned above the lower punch in an up-down direction. The metal die is provided with a low-temperature portion and a high-temperature portion. A temperature of the low-temperature portion is less than a temperature of the high-temperature portion by 10° C. or more.

2 Claims, 5 Drawing Sheets

(58) Field of Classification Search
CPC .... H01F 3/08; B22F 1/00; B22F 1/102; B22F 1/16; B22F 3/00; B22F 3/14; B30B 11/02; C22C 38/00
See application file for complete search history.

(56) References Cited

U.S. PATENT DOCUMENTS

| | | | |
|---|---|---|---|
| 2018/0361474 | A9 | 12/2018 | Nakamura et al. |
| 2019/0304665 | A1 | 10/2019 | Kitashima et al. |
| 2021/0031268 | A1 | 2/2021 | Nakamura et al. |

FOREIGN PATENT DOCUMENTS

| | | | |
|---|---|---|---|
| JP | 2004338166 | A | 12/2004 |
| JP | 2010221690 | A | 10/2010 |
| JP | 2013214665 | A | 10/2013 |
| JP | 2016162947 | A | 9/2016 |
| JP | 2017034069 | A | 2/2017 |
| JP | 2017073447 | A | 4/2017 |
| JP | 2017188677 | A | * 10/2017 |
| JP | 2019179881 | A | 10/2019 |
| JP | 6651082 | B2 | 1/2020 |

OTHER PUBLICATIONS

International Search Report (ISR) (and English language translation thereof) dated Oct. 26, 2021, issued in International Application No. PCT/JP2021/035565.
Japanese Office Action (and English language translation thereof) dated Feb. 24, 2021, issued in counterpart Japanese Application No. 2020-164976.
Japanese Office Action (and English language translation thereof) dated Oct. 21, 2020, issued in counterpart Japanese Application No. 2020-164976.
Written Opinion dated Oct. 26, 2021, issued in International Application No. PCT/JP2021/035565.
Chinese Office Action (and an English language translation thereof) dated Jun. 20, 2025, issued in counterpart Chinese Application No. 202180066983.7.

* cited by examiner

METHOD OF MANUFACTURING A DUST CORE AND THE DUST CORE

TECHNICAL FIELD

This invention relates to a method for manufacturing a dust core and to the dust core.

BACKGROUND ART

A method for manufacturing a dust core is disclosed, for example, in Patent Document 1. In the method for manufacturing the dust core of Patent Document 1, the dust core is formed by compacting magnetic particles, whose surfaces are coated with insulative material, in a metal die while heating the magnetic particles in the metal die. According to the aforementioned manufacturing method, magnetic particles and binder for binding the magnetic particles are softened by heat. Thus, the aforementioned manufacturing method enables densification of magnetic particles as compared to a method of pressure compaction of magnetic particles at room temperature.

PRIOR ART DOCUMENTS

Patent Document(s)

Patent Document 1: JP B 6651082

SUMMARY OF INVENTION

Technical Problem

However, the manufacturing method of Patent Document 1 has problems as follows: cracks and/or bulges are formed in a manufactured dust core; and the manufactured dust core does not have desired electromagnetic characteristics.

It is therefore an object of the present invention to provide a method for manufacturing a dust core which has no cracks or bulges and which has desired electromagnetic characteristics. It is also an object of the present invention to provide a dust core manufactured by the manufacturing method.

Solution to Problem

In the course of deep study of the cause of the aforementioned problems, the applicant has focused on the followings; in a general hot press machine, magnetic particles are compacted in a metal die placed in a heating chamber; and thereby the entire metal die comes to a uniform temperature.

Specifically, the applicant has noticed a phenomenon where, because a temperature distribution throughout the entire metal die is uniform, hardening of binder wholly starts at an outer part of a dust core, which is brought into contact with the metal die, if the binder is a thermosetting resin. Based on the phenomenon, the applicant has found the following: hardened resin, which is located at the outer part of the dust core, prevents release of air, which remains between the magnetic particles, to the outside of the dust core; the hardened resin at the outer part of the dust core prevents release of gas, which is produced from the binder or the like, to the outside of the dust core; and thereby cracks and/or bulges are formed in the dust core.

In addition, the applicant has also noticed a phenomenon where, because the temperature distribution throughout the entire metal die is uniform, crystallization of magnetic particles wholly starts at an outer part of a dust core, which is brought into contact with the metal die, if the magnetic particles are crystallized by heat treatment. Based on the phenomenon, the applicant has found the following: heat, which is produced by the crystallization of the outer part of the dust core, is transmitted to an inside of the dust core to heat a center part of the dust core; Fe—B compound phase, which degrades soft magnetic characteristics of the dust core, is produced in the center part of the dust core by the heat; and thereby electromagnetic characteristics of the dust core are degraded.

In other words, the applicant has found that the aforementioned problems are caused by the uniform temperature distribution throughout the entire metal die. Based on this cause, the applicant has conceived the idea of making temperature of a metal die partially non-uniform and the idea leads to the present invention.

A first aspect of the present invention provides, as a first method of manufacturing a dust core, a method for manufacturing a dust core by compacting magnetic particles in a metal die while heating the magnetic particles at a predetermined temperature in the metal die, wherein:

- at least some of the magnetic particles are coated with coating material;
- the metal die comprises a die, an upper punch and a lower punch;
- the upper punch is positioned above the lower punch in an up-down direction;
- the metal die is provided with a low-temperature portion and a high-temperature portion; and
- a temperature of the low-temperature portion is less than a temperature of the high-temperature portion by 10° C. or more.

A second aspect of the present invention provides, as a first dust core, a dust core including magnetic particles at least some of which are coated with coating material, wherein:

- the magnetic particles include nanocrystals;
- the dust core has a first surface, a second surface and a peripheral surface;
- the first surface faces in a first orientation of a predetermined direction;
- the second surface faces in a second orientation opposite to the first orientation;
- the peripheral surface intersects with a perpendicular direction perpendicular to the predetermined direction; and
- $\max(C1, C2, C)-\min(C1, C2, C)\geq 1$, where, C1 is a degree of crystallinity of the first surface, C2 is a degree of crystallinity of the second surface, and C is a degree of crystallinity of the peripheral surface.

A third aspect of the present invention provides, as a second dust core, a dust core including magnetic particles at least some of which are coated with coating material, wherein:

- the magnetic particles are metallic glasses having a glass transition temperature;
- the dust core has a first surface, a second surface and a peripheral surface;
- the first surface faces in a first orientation of a predetermined direction;
- the second surface faces in a second orientation opposite to the first orientation;
- the peripheral surface intersects with a perpendicular direction perpendicular to the predetermined direction; and
- $\min(R1, R2, R)/\max(R1, R2, R)\leq 0.95$, where, R1 is a surface resistance of the first surface, R2 is a surface resistance of the second surface, and R is a surface resistance of the peripheral surface.

Advantageous Effects of Invention

The method for manufacturing the dust core of the present invention is configured as follows: the metal die is provided with the low-temperature portion and the high-temperature portion; and the temperature of the lower-temperature portion is less than the temperature of the high-temperature portion by 10° C. or more. Accordingly, in the manufacturing method of the dust core of the present invention, an outer surface of the dust core includes a first part, which is brought into contact with the low-temperature portion of the metal die, and a second part which is brought into contact with the high-temperature portion of the metal die, and hardening of binder in the first part proceeds more slowly than the hardening of the binder in the second part. Thus, air, which remains between the magnetic particles, and/or gas produced from the binder or the like are/is released from the first part and thereby no cracks or bulges are formed in the dust core. In addition, according to the manufacturing method of the dust core of the present invention, heat produced by crystallization of the magnetic particles is dissipated to the outside of the dust core via the low-temperature portion of the metal die, and thereby a center part of the dust core is not overheated even at the end of the crystallization reaction. Thus, according to the manufacturing method of the dust core of the present invention, Fe—B compound phase, which degrades soft magnetic characteristics of the dust core, is not produced in the dust core. In other words, the manufacturing method of the dust core of the present invention can produce the dust core which has no cracks or bulges and which has desired electromagnetic characteristics.

In addition, the dust core of the present invention is configured as follows: the magnetic particles include the nanocrystals; and max(C1, C2, C)−min(C1, C2, C)≥1, where, C1 is the degree of crystallinity of the first surface, C2 is the degree of crystallinity of the second surface, and C is the degree of crystallinity of the peripheral surface. Thus, the dust core of the present invention has no cracks or bulges and has desired electromagnetic characteristics.

Furthermore, the dust core of the present invention is configured as follows: the magnetic particles are the metallic glasses having the glass transition temperature; and min(R1, R2, R)/max(R1, R2, R)≤0.95, where, R1 is the surface resistance of the first surface, R2 is the surface resistance of the second surface, and R is the surface resistance of the peripheral surface. Thus, the dust core of the present invention has no cracks or bulges and has desired electromagnetic characteristics.

An appreciation of the objectives of the present invention and a more complete understanding of its structure may be had by studying the following description of the preferred embodiment and by referring to the accompanying drawings.

DESCRIPTION OF EMBODIMENTS

Figure 1:
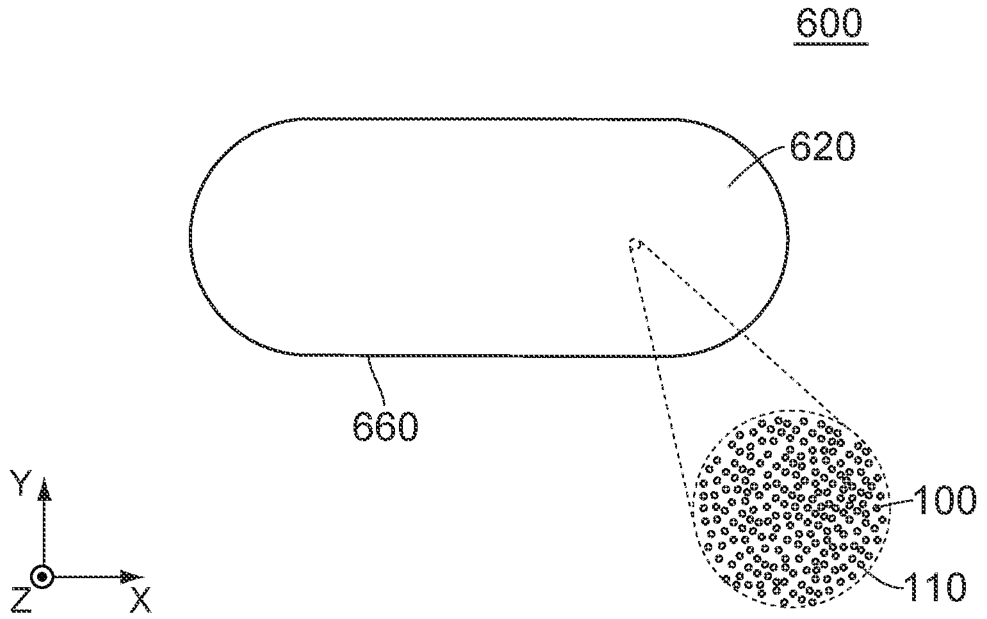
FIG. 1 is a top view showing a dust core according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

First Embodiment

As shown in FIG. 1, a dust core 600 of a present embodiment includes magnetic particles 100 which are coated with coating material 110. However, the present invention is not limited thereto, but the dust core 600 should includes the magnetic particles 100 at least some of which are coated with the coating material 110. In other words, some of the magnetic particles 100 may be uncoated with the coating material 110.

(Magnetic Particle)

The magnetic particles 100 of the present embodiment include nanocrystals in its amorphous phase. In other words, the magnetic particles 100 is configured so that the nanocrystals are precipitated in its amorphous phase by heat treatment. Specifically, the magnetic particles 100 are made of, for example, material based on Fe—B—Si—P—C—Cu, material based on Fe—B—Si—Nb—Cu, or material based on Fe—(Nb, Zr)—B. The magnetic particles 100 have a crystallization temperature Tc.

(Coating)

The purpose of the coating material 110 of the present embodiment is insulation of the magnetic particles 100 from each other and increase of mechanical strength of the magnetic particles 100. The coating material 110 is formed of organic material such as resin, or of inorganic material such as metal oxide. The resin forming the coating material 110 includes thermosetting resin such as silicone resin, epoxy resin, phenolic resin, polyamide resin, and polyimide resin, as well as thermoplastic resin such as PPS or PEEK. The inorganic material forming the coating material 110 includes metal oxide such as alumina, silica, magnesia or the like, low melting temperature glass material such as phosphate oxide, borate oxide, silicate oxide or the like, and inorganic polymer such as polysilane, polysilazane or the like. It is noted that the coating material 110 may be formed only of organic material. The coating material 110 may be formed only of inorganic material. The coating material 110 may be formed from composite of organic material and inorganic material. More in detail, the coating material 110 may be formed as follows: the coating material 110 is composed of two layers, namely, an inner layer and an outer layer; the inner layer is in contact with a surface of the magnetic particles 100; the inner layer is formed of inorganic material; the outer layer is positioned outside the inner layer; and the outer layer is formed of organic material. It is noted that the coating material 110 may be formed of a plurality of materials. The coating material 110 may have two or more multiple layers which are formed of different materials.

Figure 2:
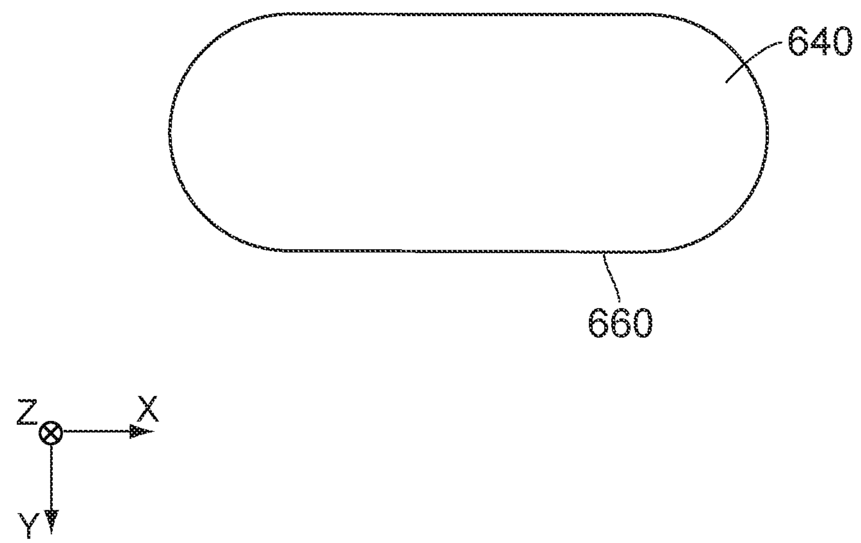
FIG. 2 is a bottom view showing the dust core of FIG. 1.

As shown in FIGS. 1 and 2, the dust core 600 of the present embodiment has a first surface 620, a second surface 640 and a peripheral surface 660.

As shown in FIG. 1, the first surface 620 of the present embodiment faces in a first orientation of a predetermined direction. The first surface 620 is a plane perpendicular to the predetermined direction. As shown in FIG. 2, the second surface 640 of the present embodiment faces in a second orientation opposite to the first orientation. The second surface 640 is a plane perpendicular to the predetermined direction. In the present embodiment, the predetermined direction is a Z-direction. In addition, the predetermined direction is also referred to as an up-down direction. Specifically, it is assumed that upward is a positive Z-direction while downward is a negative Z-direction. Additionally, the first orientation is a positive Z-direction while the second orientation is a negative Z-direction. Specifically, the first orientation is upward while second orientation is downward.

As shown in FIG. 1, the peripheral surface 660 of the present embodiment intersects with a perpendicular direction perpendicular to the predetermined direction. The peripheral surface 660 has an outer edge with a race track shape when the dust core 600 is viewed in the predetermined direction.

The dust core 600 of the present embodiment is configured so that $\max(C1, C2, C)-\min(C1, C2, C)\geq 1$, where, C1 is a degree of crystallinity of the first surface 620, C2 is a degree of crystallinity of the second surface 640, and C is a degree of crystallinity of the peripheral surface 660. In other words, the dust core 600 of the present embodiment is configured so that $C_{max}-C_{min}\geq 1$, where, Cmax is a maximum value among the degree of crystallinity C1 of the first surface 620, the degree of crystallinity C2 of the second surface 640 and the degree of crystallinity C of the peripheral surface 660, and Cmin is a minimum value among the degree of crystallinity C1 of the first surface 620, the degree of crystallinity C2 of the second surface 640 and the degree of crystallinity C of the peripheral surface 660. Thus, the dust core 600 of the present invention has no cracks or bulges and has desired electromagnetic characteristics. Specifically, in the present embodiment, the degree of crystallinity C of the peripheral surface 660 is the maximum value among the degree of crystallinity C1 of the first surface 620, the degree of crystallinity C2 of the second surface 640 and the degree of crystallinity C of the peripheral surface 660. That is, in the present embodiment, $\max(C1, C2, C)=C$. The degree of crystallinity C1 of the first surface 620, the degree of crystallinity C2 of the second surface 640 and the degree of crystallinity C of the peripheral surface 660 are calculated by analyzing measurement results obtained from X-ray diffraction (XRD: X-ray diffraction) by using WPPD method (Whole-powder-pattern decomposition method).

(Method of Manufacturing the Dust Core)

Referring to FIGS. 1 to 6, the dust core 600 of the present embodiment is manufactured as follows.

Figure 3:
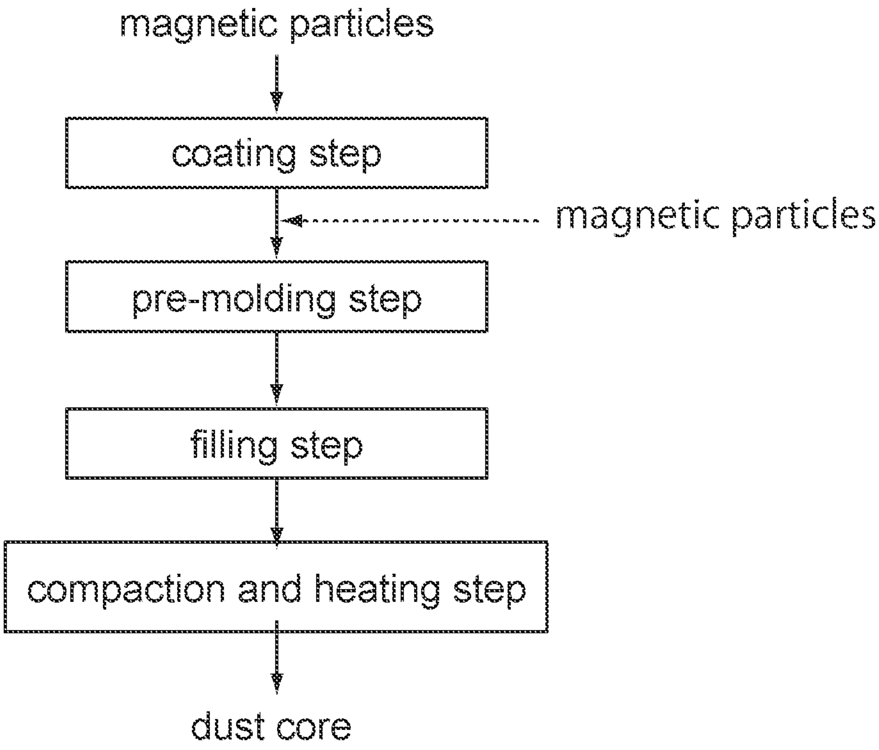
FIG. 3 is a flow diagram for explaining a method of manufacturing the dust core of FIG. 1.

FIG. 3 is a flow diagram showing a method of manufacturing the dust core 600 of the present embodiment. Specifically, the dust core 600 is manufactured by performing a coating step, a pre-molding step, a filling step and a compaction and heating step in this order. Each step is described in detail below.

(Coating Step)

In the coating step, the magnetic particles 100, whose surfaces are coated with the coating material 110, are prepared as a raw material of the dust core 600. However, the present invention is not limited thereto. A mixture of the magnetic particles 100, whose surfaces are coated with the coating material 110, and the magnetic particles 100, whose surfaces are uncoated with the coating material 110, may be prepared as a raw material of the dust core 600.

The method of coating the magnetic particles 100 can be selected from various methods such as particle mixing, dipping, spraying, fluidized bed method, sol-gel processing, CVD method and PVD method, taking into account the type of material to be coated and these economic efficiencies.

(Pre-Molding Step)

The magnetic particles 100 is pre-molded after the coating step is performed.

(Filling Step)

Figure 4:
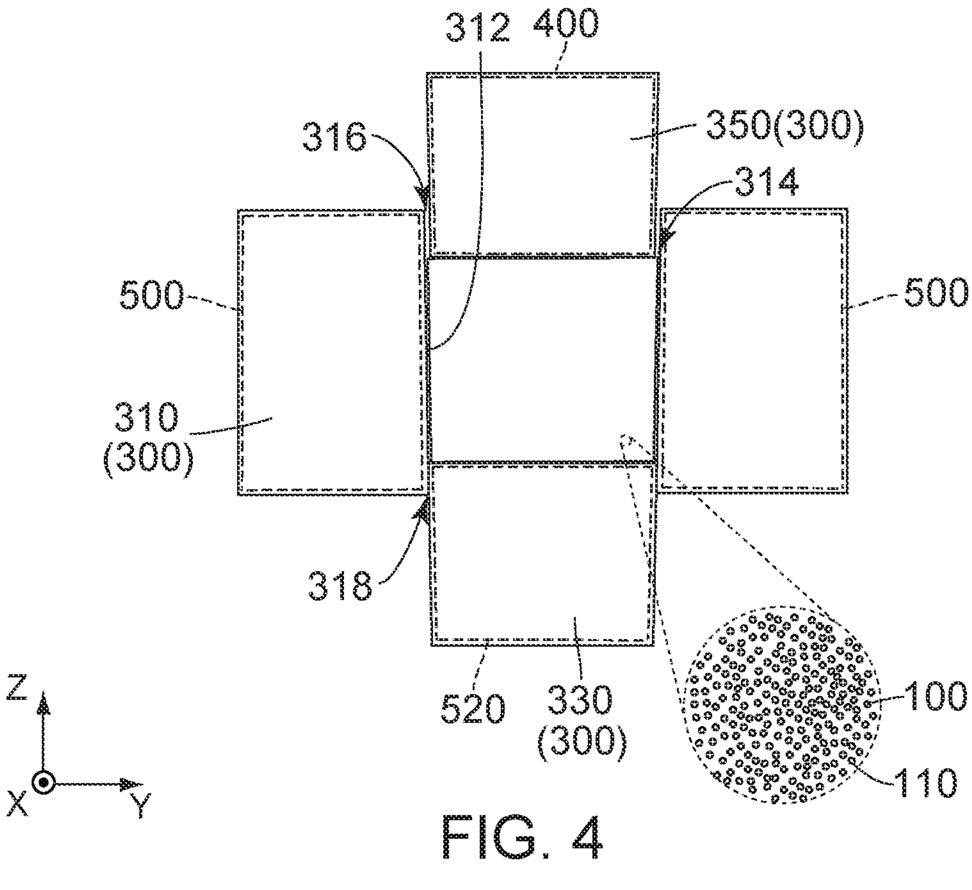
FIG. 4 is a view for explaining the manufacturing method of the dust core of FIG. 1. In the figure, an upper punch and a lower punch of a metal die are in their initial states.

Referring to FIG. 4, after the pre-molding step is performed, the pre-molded product is accommodated in a predetermined metal die 300. The metal die 300, which is used for manufacturing the dust core 600 of the present embodiment, is described in detail below.

As shown in FIG. 4, the metal die 300, which is used for manufacturing the dust core 600 of the present embodiment, comprises a die 310, an upper punch 350 and a lower punch 330.

Referring to FIG. 4, the die 310 of the present embodiment surrounds the upper punch 350 in a perpendicular plane perpendicular to the up-down direction. The die 310 surrounds the lower punch 330 in the perpendicular plane. The die 310 has a first opening 316, a second opening 318, an inner wall 312 and an accommodating portion 314. The first opening 316 is positioned at an upper end of the die 310 in the up-down direction. The second opening 318 is positioned at a lower end of the die 310 in the up-down direction. The first opening 316 has an outer periphery which is lager than that of the second opening 318 in a direction perpendicular to the up-down direction. The inner wall 312 is tapered downward in the up-down direction. In other words, the die 310 has the inner wall 312 which is tapered downward in the up-down direction. The accommodating portion 314 is a hole piercing the die 310 in the up-down direction. The accommodating portion 314 connects the first opening 316 and the second opening 318 with each other.

As shown in FIG. 4, the upper punch 350 of the present embodiment is partially accommodated in the accommodating portion 314 of the die 310. The upper punch 350 is positioned above the lower punch 330 in the up-down direction.

As shown in FIG. 4, the lower punch 330 of the present embodiment is partially accommodated in the accommodating portion 314 of the die 310. The lower punch 330 is positioned below the upper punch 350 in the up-down direction.

Referring to FIG. 4, the accommodation of the pre-molded product into the metal die 300, namely, filling of the magnetic particles 100 into the metal die 300 is performed as follows: the magnetic particles 100 are installed into the accommodating portion 314 of the metal die 300 from the first opening 316 in a state where the lower punch 330 is inserted into the accommodating portion 314 from below through the second opening 318 of the metal die 300; and after the installation of the magnetic particles 100 is accomplished, the upper punch 350 is partially inserted into the accommodating portion 314 through the first opening 316.

(Compaction and Heating Step)

Figure 5:
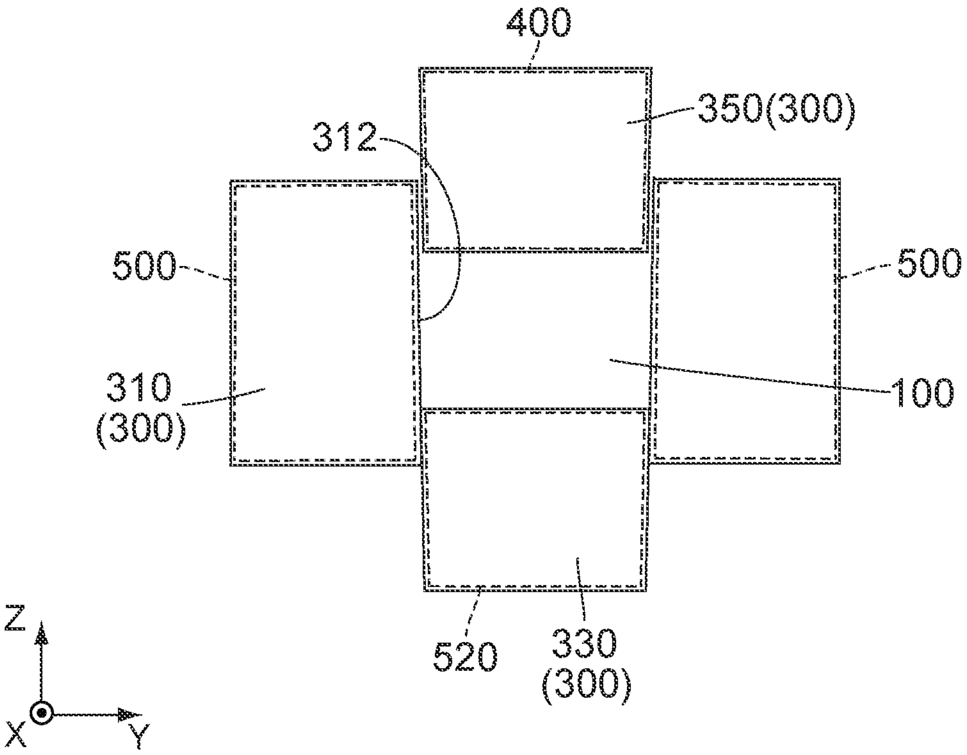
FIG. 5 is another view for explaining the manufacturing method of the dust core of FIG. 1. In the figure, the upper punch and the lower punch are in the middle of pressing magnetic particles.
Figure 6:
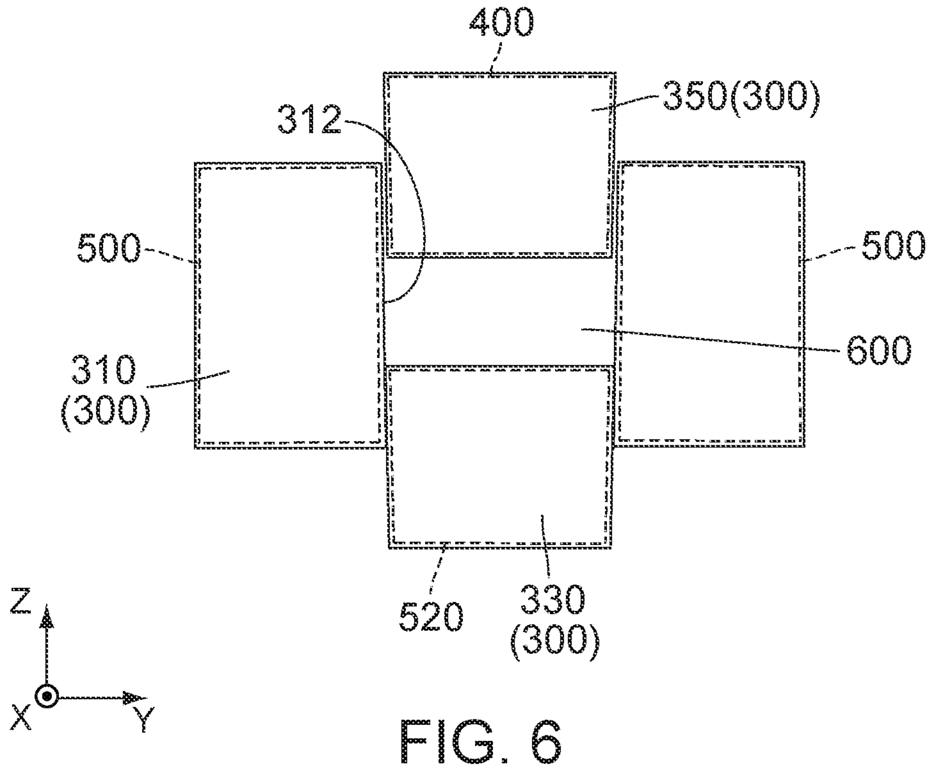
FIG. 6 is yet another view for explaining the manufacturing method of the dust core of FIG. 1. In the figure, the upper punch and the lower punch are in a state where their pressings against the magnetic particles are completed.

Referring to FIGS. 4 to 6, after the filling step is performed, the magnetic particles 100 are compacted and heated in the metal die 300, and thereby the dust core 600 is obtained as a molded product. In other words, the dust core 600 of the present embodiment is manufactured by compacting the magnetic particles 100, which are coated with the coating material 110, in the metal die 300 while heating the magnetic particles 100 at a predetermined temperature T in the metal die 300. However, the present invention is not limited thereto. The dust core 600 may be manufactured by compacting the magnetic particles 100, at least some of which are coated with the coating material 110, in the metal die 300 while heating the magnetic particles 100 at the predetermined temperature T in the metal die 300. In other words, the dust core 600 may be manufactured by compacting the magnetic particles 100, which are coated with the coating material 110, and the magnetic particles 100, which are uncoated with the coating material 110, in the metal die 300 while heating them at the predetermined temperature T in the metal die 300. It is noted that the predetermined temperature T is greater than the crystallization temperature Tc of the magnetic particles 100.

Specifically, heat and molding pressure are applied to the magnetic particles 100 which are filled in the metal die 300. At that time, the dust core 600 has higher density as the molding pressure is higher. However, even if the molding pressure is excessively high, the increase of the density of the dust core 600 reaches a plateau and there is an increased risk that the metal die 300 is broken. Thus, the molding pressure is in a range between 100 and 2000 MPa. The heating of the magnetic particles 100 filled therein is performed by setting temperatures in the metal die 300 so that the metal die 300 has a temperature distribution as described below.

As shown in FIG. 4, the metal die 300 of the present embodiment is provided with a low-temperature portion 400 and a high-temperature portion 500. A temperature Tl of the low-temperature portion 400 is less than a temperature Th of the high-temperature portion 500 by 10° C. or more. More specifically, the die 310 functions as the high-temperature portion 500, and the upper punch 350 functions as the low-temperature portion 400. However, the present invention is not limited thereto, but the lower punch 330 may function as the low-temperature portion 400. It is noted that the crystallization temperature Tc of the magnetic particles 100 as described above is less than the temperature Th of the high-temperature portion 500. A temperature difference between the temperature Tl of the low-temperature portion 400 and the temperature Th of the high-temperature portion 500 is preferred to be 650° C. or less. The temperature difference between the temperature Tl of the low-temperature portion 400 and the temperature Th of the high-temperature portion 500 is more preferred to be 420° C. or less.

As shown in FIG. 4, the metal die 300 of the present embodiment is further provided with an additional high-temperature portion 520. A temperature Tm of the additional high-temperature portion 520 is between the temperature Tl of the low-temperature portion 400 and the temperature Th of the high-temperature portion 500. It is noted that the temperature Tm of the additional high-temperature portion 520 is preferred to be greater than the temperature Tl of the low-temperature portion 400 by 10° C. or more. In the present embodiment, the lower punch 330 functions as the additional high-temperature portion 520. It is noted that the upper punch 350 functions as the additional high-temperature portion 520 if the lower punch 330 functions as the low-temperature portion 400.

Referring to FIGS. 4 to 6, the application of the molding pressure to the magnetic particles 100 and the heating of the magnetic particles 100 are performed as follows.

First, compacting forces against the magnetic particles 100, which are filled in the metal die 300, are applied to the upper punch 350 and the lower punch 330. Next, the low-temperature portion 400, the high-temperature portion 500 and the additional high-temperature portion 520 of the metal die 300 are heated by a heater, high-frequency induction heating, heating by burner or the like so that the temperature Th of the high-temperature portion 500 is greater than the temperature Tl of the low-temperature portion 400 by 10° C. or more while the temperature Tm of the additional high-temperature portion 520 is between the temperature Tl of the low-temperature portion 400 and the temperature Th of the high-temperature portion 500. After that, the metal die 300 is cooled, the resulting dust core 600 is removed from the metal die 300, and the dust core 600 is obtained as the molded product. It is noted that nanocrystals are precipitated in an amorphous phase of the dust core 600 of the present embodiment when the compaction and heating step is performed.

As understood from FIGS. 1, 2 and 4, the first surface 620 of the manufactured dust core 600 is a part which was in contact with the upper punch 350 of the metal die 300 when the magnetic particles 100 are compacted and molded in the metal die 300. In other words, the first surface 620 is the part which was in contact with the low-temperature portion 400 of the metal die 300 when the magnetic particles 100 are compacted and molded in the metal die 300. The second surface 640 of the manufactured dust core 600 is a part which was in contact with the lower punch 330 of the metal die 300 when the magnetic particles 100 are compacted and molded in the metal die 300. In other words, the second surface 640 is the part which was in contact with the additional high-temperature portion 520 of the metal die 300 when the magnetic particles 100 are compacted and molded in the metal die 300. Additionally, the peripheral surface 660 of the manufactured dust core 600 is a part which was in contact with the inner wall 312 of the die 310 of the metal die 300 when the magnetic particles 100 are compacted and molded in the metal die 300. In other words, the peripheral surface 660 is the part which was in contact with the high-temperature portion 500 of the metal die 300 when the magnetic particles 100 are compacted and molded in the metal die 300.

As described above, the first surface 620, the second surface 640 and the peripheral surface 660 of the dust core 600 are the parts which are in contact with the upper punch 350, the lower punch 330 and the die 310, respectively, of the metal die 300 used in the manufacturing process of the dust core 600. Accordingly, characteristics of the first surface 620, the second surface 640 and the peripheral surface 660 are influenced by the temperature settings of the parts of the metal die 300 that were in contact with the first surface 620, second surface 640 and the peripheral surface 660.

Although the method of manufacturing the aforementioned dust core 600 comprising the coating step, the pre-molding step, the filling step and the compaction and heating step, the present invention is not limited thereto. The manufacturing method of the dust core 600 may be modified so that the dust core 600 is manufactured without performing the pre-molding step. In other words, the dust core 600 may be manufactured by performing the coating step, the filling step and the compaction and heating step in this order. Furthermore, the manufacturing method of the dust core 600 may be modified so that the dust core 600, which is manufactured via the compaction and heating step, is further subjected to heat treatment.

Second Embodiment

Figure 7:
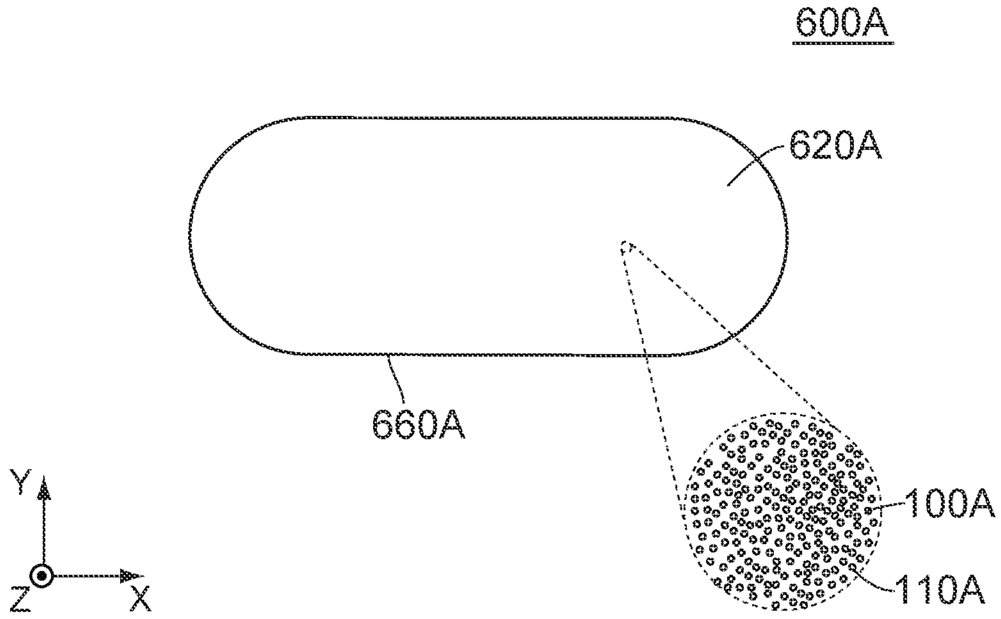
FIG. 7 is a top view showing a dust core according to a second embodiment of the present invention.
Figure 8:
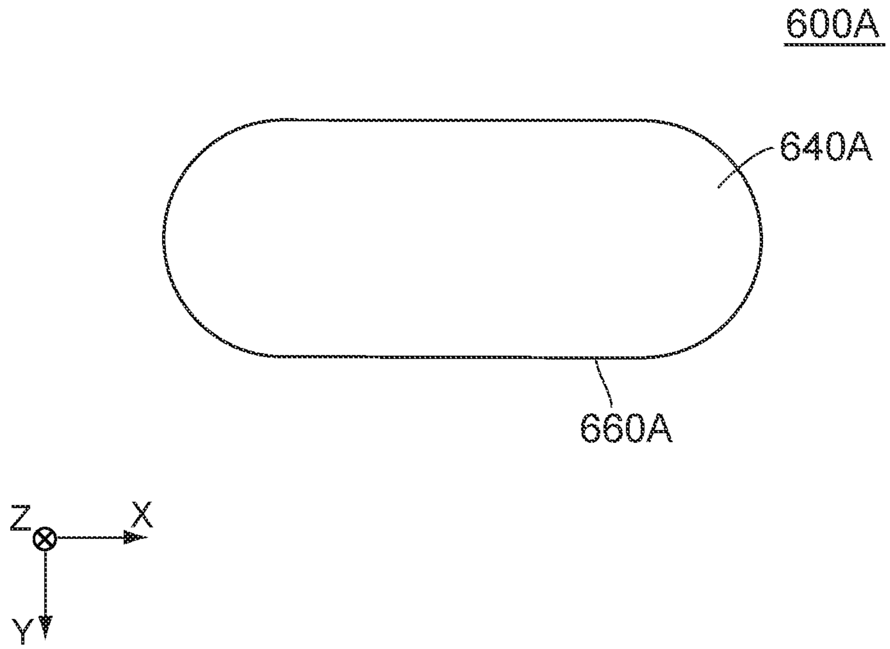
FIG. 8 is a bottom view showing the dust core of FIG. 7.

As shown in FIGS. 7 and 8, a dust core 600A of a present embodiment includes magnetic particles 100A which are coated with coating material 110A. However, the present invention is not limited thereto, but the dust core 600A should includes the magnetic particles 100A at least some of which are coated with the coating material 110A. In other words, some of the magnetic particles 100A may be uncoated with the coating material 110A.

(Magnetic Particle)

The magnetic particles 100A of the present embodiment are metallic glasses having a glass transition temperature. Specifically, the magnetic particles 100A are made of, for example, material based on FePCBSiGa, material based on FeSiBM (M is a transition metal) or material based on FePBM (M is a transition metal). The magnetic particles 100A have a glass transition temperature Tg.

(Coating)

The purpose of the coating material 110A of the present embodiment is insulation of the magnetic particles 100A from each other and increase of mechanical strength of the magnetic particles 100A. The coating material 110A is formed of organic material such as resin, or of inorganic material such as metal oxide. It is noted that resins, which are same as the resins each forming the coating material 110 of the first embodiment, can be used as resins each forming the coating material 110A.

As shown in FIGS. 7 and 8, the dust core 600A of the present embodiment has a first surface 620A, a second surface 640A and a peripheral surface 660A.

As shown in FIG. 7, the first surface 620A of the present embodiment faces in a first orientation of a predetermined direction. The first surface 620A is a plane perpendicular to the predetermined direction. As shown in FIG. 8, the second surface 640A of the present embodiment faces in a second orientation opposite to the first orientation. The second surface 640A is a plane perpendicular to the predetermined direction. The peripheral surface 660A of the present embodiment intersects with a perpendicular direction perpendicular to the predetermined direction. The peripheral surface 660A has an outer edge with a race track shape when the dust core 600A is viewed in the predetermined direction.

The dust core 600A of the present embodiment is configured so that min (R1, R2, R)/max(R1, R2, R)≤0.95, where, R1 is a surface resistance of the first surface 620A, R2 is a surface resistance of the second surface 640A, and R is a surface resistance of the peripheral surface 660A. In other words, the dust core 600A of the present embodiment is configured so that Rmin/Rmax≤0.95, where, Rmax is a maximum value among the surface resistance R1 of the first surface 620A, the surface resistance R2 of the second surface 640A and the surface resistance R of the peripheral surface 660A, and Rmin is a minimum value among the surface resistance R1 of the first surface 620A, the surface resistance R2 of the second surface 640A and the surface resistance R of the peripheral surface 660A. Thus, the dust core 600A of the present invention has no cracks or bulges and has desired electromagnetic characteristics. It is noted that each of the surface resistances R1, R2 and R of the first surface 620A, the second surface 640A and the peripheral surface 660A is measured by probes of a circuit tester being brought into contact with a surface of each of the first surface 620A, the second surface 640A and the peripheral surface 660A so that a distance between the probes is 10.5 mm.

(Method of Manufacturing the Dust Core)

Referring to FIGS. 3 to 9, the dust core 600A of the present embodiment is manufactured as follows.

Specifically, similar to that of the dust core 600 of the first embodiment, the dust core 600A of the present embodiment is manufactured by performing a coating step, a pre-molding step, a filling step and a compaction and heating step in this order. Among the steps, the coating step and the pre-molding step are same as those of the first embodiment, and a detailed explanation thereabout is omitted.

(Filling Step)

Figure 9:
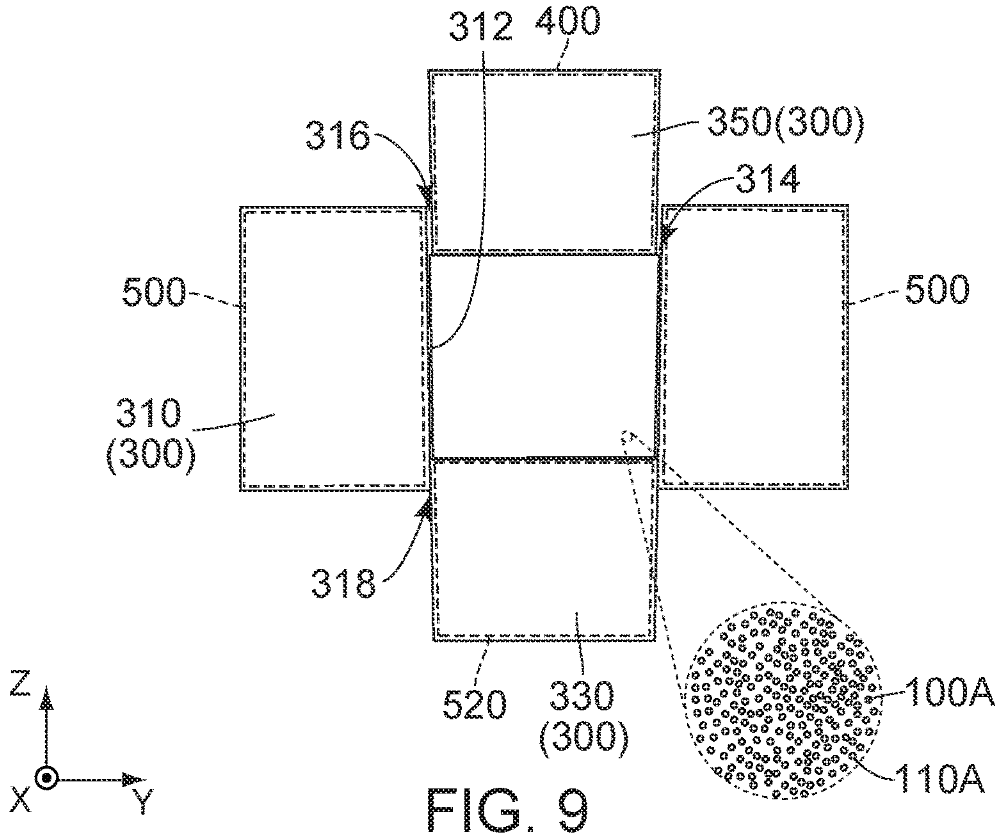
FIG. 9 is a view for explaining a method of manufacturing the dust core of FIG. 7. In the figure, an upper punch and a lower punch of a metal die are in their initial states.

Referring to FIG. 9, the magnetic particles 100A are filled in a predetermined metal die 300 after the pre-molding step is performed. The metal die 300 of the present embodiment has a structure same as that of the metal die 300 of the aforementioned first embodiment, and a detailed explanation thereabout is omitted.

Referring to FIG. 9, the filling of the magnetic particles 100A into the metal die 300 is performed by installing the magnetic particles 100A into an accommodating portion 314 of the metal die 300 through a first opening 316 in a state where a lower punch 330 is inserted into the accommodating portion 314 from below through a second opening 318 of the metal die 300, followed by partially inserting an upper punch 350 into the accommodating portion 314 through the first opening 316 after the installation of the magnetic particles 100A is accomplished.

(Compaction and Heating Step)

Referring to FIGS. 9 and 4 to 6, after the filling step is performed, the magnetic particles 100A are compacted and heated in the metal die 300, and thereby the dust core 600A is obtained as a molded product. In other words, the dust core 600A of the present embodiment is manufactured by compacting the magnetic particles 100A, which are coated with the coating material 110A, in the metal die 300 while heating the magnetic particles 100A at a predetermined temperature TA in the metal die 300. However, the present invention is not limited thereto. The dust core 600A may be manufactured by compacting the magnetic particles 100A, at least some of which are coated with the coating material 110A, in the metal die 300 while heating the magnetic particles 100A at the predetermined temperature TA in the metal die 300. In other words, the dust core 600A may be manufactured by compacting the magnetic particles 100A, which are coated with the coating material 110A, and the magnetic particles 100A, which are uncoated with the coating material 110A, in the metal die 300 while heating them at the predetermined temperature TA in the metal die 300.

Specifically, heat and molding pressure are applied to the magnetic particles 100A which are filled in the metal die 300. At that time, the dust core 600A has higher density as the molding pressure is higher. However, even if the molding pressure is excessively high, the increase of the density of the dust core 600 reaches a plateau and there is an increased risk that the metal die 300 is broken. Thus, the molding pressure is preferred in a range between 100 and 2000 MPa. The heating of the magnetic particles 100A filled therein is performed by setting temperatures in the metal die 300 so that the metal die 300 has a temperature distribution as described below.

As shown in FIG. 9, the metal die 300 of the present embodiment is provided with a low-temperature portion 400 and a high-temperature portion 500. A temperature Tl of the low-temperature portion 400 is less than a temperature Th of the high-temperature portion 500 by 10° C. or more. More specifically, the die 310 functions as the high-temperature portion 500, and the upper punch 350 functions as the low-temperature portion 400. However, the present invention is not limited thereto, but the lower punch 330 may function as the low-temperature portion 400. A temperature difference between the temperature Tl of the low-temperature portion 400 and the temperature Th of the high-temperature portion 500 is preferred to be 650° C. or less. The temperature difference between the temperature Tl of the low-temperature portion 400 and the temperature Th of the high-temperature portion 500 is more preferred to be 420° C. or less.

As shown in FIG. 9, the metal die 300 of the present embodiment is further provided with an additional high-temperature portion 520. A temperature Tm of the additional high-temperature portion 520 is between the temperature Tl of the low-temperature portion 400 and the temperature Th of the high-temperature portion 500. It is noted that the temperature Tm of the additional high-temperature portion 520 is preferred to be greater than the temperature of the low-temperature portion 400 by 10° C. or more. In the present embodiment, the lower punch 330 functions as the additional high-temperature portion 520. It is noted that the upper punch 350 functions as the additional high-temperature portion 520 if the lower punch 330 functions as the low-temperature portion 400.

Referring to FIGS. 9, 4 to 6, the application of the molding pressure and heating to the magnetic particles 100A are performed as follows.

First, compacting forces against the magnetic particles 100A, which are filled in the metal die 300, are applied to the upper punch 350 and the lower punch 330. Next, the low-temperature portion 400, the high-temperature portion 500 and the additional high-temperature portion 520 of the metal die 300 are heated by a heater, high-frequency induction heating, burner heating or the like so that the temperature Th of the high-temperature portion 500 is greater than the temperature Tl of the low-temperature portion 400 by 10° C. or more while the temperature Tm of the additional high-temperature portion 520 is between the temperature Tl of the low-temperature portion 400 and the temperature Th of the high-temperature portion 500. After that, the metal die 300 is cooled, the resulting dust core 600A is removed from the metal die 300, and the dust core 600A is obtained as the molded product.

As understood from FIGS. 7 to 9, the first surface 620A of the manufactured dust core 600A is a part which was in contact with the upper punch 350 of the metal die 300 when the magnetic particles 100A are compacted and molded in the metal die 300. In other words, the first surface 620A is the part which was in contact with the low-temperature portion 400 of the metal die 300 when the magnetic particles 100A are compacted and molded in the metal die 300. The second surface 640A of the manufactured dust core 600A is a part which was in contact with the lower punch 330 of the metal die 300 when the magnetic particles 100A are compacted and molded in the metal die 300. In other words, the second surface 640A is the part which was in contact with the additional high-temperature portion 520 of the metal die 300 when the magnetic particles 100A are compacted and molded in the metal die 300. The peripheral surface 660A of the manufactured dust core 600A is a part which was in contact with an inner wall 312 of the die 310 of the metal die 300 when the magnetic particles 100A are compacted and molded in the metal die 300. In other words, the peripheral surface 660 is the part which was in contact with the high-temperature portion 500 of the metal die 300 when the magnetic particles 100A are compacted and molded in the metal die 300.

As described above, the first surface 620A, the second surface 640A and the peripheral surface 660A of the dust core 600A are the parts which are in contact with the upper punch 350, the lower punch 330 and the die 310, respectively, of the metal die 300 used in the manufacturing process of the dust core 600A. Accordingly, characteristics of the first surface 620A, the second surface 640A and the peripheral surface 660A are influenced by the temperature settings of the parts of the metal die 300 that were in contact with the first surface 620A, second surface 640A and the peripheral surface 660A.

Although the manufacturing method of the aforementioned dust core 600A comprising the coating step, the pre-molding step, the filling step and the compaction and heating step, the present invention is not limited thereto. The manufacturing method of the dust core 600A may be modified so that the dust core 600A is manufactured without performing the pre-molding step. In other words, the dust core 600A may be manufactured by performing the coating step, the filling step and the compaction and heating step in this order.

The metal die 300 used in the manufacturing methods of the dust cores 600, 600A of the aforementioned embodiments can be modified as follows.

Figure 10:
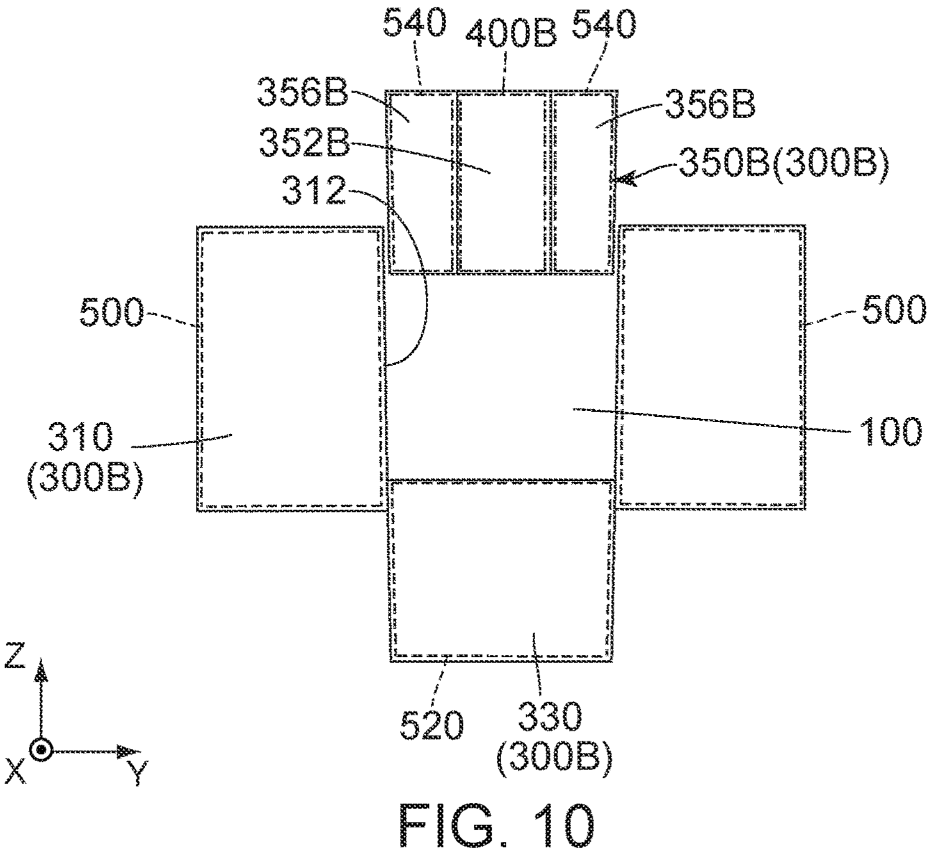
FIG. 10 is a view for explaining a modification of the manufacturing methods of the dust cores of FIGS. 1 and 7. In the figure, an upper punch and a lower punch of a metal die are in their initial states.

As shown in FIG. 10, a metal die 300B of a present modification comprises a die 310, an upper punch 350B and a lower punch 330. The die 310 and the lower punch 330 have structures same as those of the die 310 and the lower punch 330 of the metal die 300 of the aforementioned embodiments, and a detailed explanation thereabout is omitted.

As shown in FIG. 10, the upper punch 350B of the present modification is positioned above the lower punch 330 in the up-down direction. The upper punch 350B is formed by combining a plurality of members. The plurality of members, which form the upper punch 350B, include a low-temperature member 352B and high-temperature members 356B.

As shown in FIG. 10, the metal die 300B of the present modification is provided with a low-temperature portion 400B, a high-temperature portion 500, an additional high-temperature portion 520 and auxiliary high-temperature portions 540. A temperature Tl of the low-temperature portion 400B is less than a temperature Th of the high-temperature portion 500 by 10° C. or more. A temperature Tm of the additional high-temperature portion 520 is between the temperature Tl of the low-temperature portion 400B and the temperature Th of the high-temperature portion 500. A temperature Td of each of the auxiliary high-temperature portions 540 is between the temperature Tl of the low-temperature portion 400B and the temperature Th of the high-temperature portion 500. A temperature difference between the temperature Tl of the low-temperature portion 400B and the temperature Th of the high-temperature portion 500 is preferred to be 650° C. or less. The temperature difference between the temperature Tl of the low-temperature portion 400B and the temperature Th of the high-temperature portion 500 is more preferred to be 420° C. or less. The temperature Tm of the additional high-temperature portion 520 is preferred to be greater than the temperature Tl of the low-temperature portion 400B by 10° C. or more, and the temperature Td of each of the auxiliary high-temperature portions 540 is preferred to be greater than the temperature Tl of the low-temperature portion 400B by 10° C. or more. The temperature Td of each of the auxiliary high-temperature portions 540 may be equal to the temperature Th of the high-temperature portion 500. In the present modification, the low-temperature member 352B functions as the low-temperature portion 400B, the die 310 functions as the high-temperature portion 500, the lower punch 330 functions as the additional high-temperature portion 520 and the high-temperature members 356B function as the auxiliary high-temperature portions 540, respectively. Although the low-temperature portion 400B is arranged so as to be sandwiched by the two auxiliary high-temperature portions 540 in a Y-direction as shown in FIG. 10, the present invention is not limited thereto. Specifically, the arrangement of the low-temperature portion 400B and auxiliary high-temperature portions 540 may be in reverse manner. In other words, the auxiliary high-temperature portion 540 may be arranged so as to be sandwiched by two low-temperature portions 400B in the Y-direction. The lower punch 330 may be formed by combining a plurality of members which include the low-temperature member 352B and the high-temperature members 356B.

(Compacting and Molding)

Referring to FIG. 10, the filling of the magnetic particles 100, 100A into the metal die 300B and the compacting and molding of the magnetic particles 100, 100A are performed as similar to the aforementioned embodiments.

(Dust Core)

Also in the present modification, the dust core 600, 600A, which includes the magnetic particle 100, 100A which are coated with the coating material 110, 100A, is obtained by compacting and heating the magnetic particles 100, 100A, which are coated with the coating material 110, 100A, under a predetermined condition as described above.

Further detailed explanation will be made about the embodiments of the present invention with reference to examples.

Examples 1 to 26 and A1 to A15 and Comparative Examples 1 to 9 and A1 to A16

Particles made of $Fe_{80.9}Si_3B_6P_{8.5}Cr_1Cu_{0.6}$ (at %) are used as magnetic particles 100. The magnetic particles 100 are coated with insulative coating material 110 by mixing the insulative coating material 110, which is a material based on $P_2O_5$—ZnO—$R_2O$, with the magnetic particles 100 to form a compound so that the content of the insulative coating material 110 is 1.0 wt % by weight of the compound. A mixture is made by mixing the magnetic particles 100, which are coated with the insulative coating material 110, with phenolic resin as a binder so that the content of the binder is 0.4 wt % by weight of the mixture. The mixture (weight: 37 g) is filled in the metal die 300, and is heated at temperatures shown in below table 1 and compacted at a molding pressure of 8 t/cm$^2$, and a dust core, which has a length of 55.69 mm, a width of 23 mm and a thickness of 4.5 mm, is manufactured. In $Fe_{80.9}Si_3B_6P_{8.5}Cr_1Cu_{0.6}$, a precipitation temperature (crystallization temperature Tc), at which αFe is precipitated, is 400° C. In $Fe_{80.9}Si_3B_6P_{8.5}Cr_1Cu_{0.6}$, a precipitation temperature, at which Fe—B compound is precipitated, is 499° C. Evaluation results of the manufactured dust cores are shown in Table 1.

TABLE 1

| | Lipper Punch (° C.) | Lower Punch (° C.) | Die (° C.) | Die/Upper Punch Temperature Difference (° C.) | Die/Lower Punch Temperature Difference (° C.) | Appearance Of Dust Core | Phase | Judgement |
|---|---|---|---|---|---|---|---|---|
| Comparative Example 1 | 520 | 520 | 520 | 0 | 0 | Crack | Compound | × |
| Comparative Example 2 | 515 | 520 | 520 | 5 | | Crack | Compound | × |
| Example 1 | 510 | 520 | 520 | 10 | 0 | Good | α Fe | ○ |
| Example 2 | 350 | 520 | 520 | 170 | 0 | Good | α Fe | ○ |
| Example 3 | 250 | 520 | 520 | 270 | 0 | Good | α Fe | ○ |
| Example 4 | 100 | 520 | 520 | 420 | 0 | Good | α Fe | ○ |
| Example 5 | 520 | 420 | 520 | 0 | 100 | Good | α Fe | ○ |
| Example 6 | 350 | 420 | 520 | 170 | 100 | Good | α Fe | ○ |
| Example 7 | 250 | 420 | 520 | 270 | 100 | Good | α Fe | ○ |
| Example 8 | 100 | 420 | 520 | 420 | 100 | Good | α Fe | ○ |
| Comparative Example 3 | 500 | 500 | 500 | 0 | 0 | Crack | Compound | × |
| Comparative Example 4 | 495 | 500 | 500 | 5 | 0 | Crack | Compound | × |
| Example 9 | 490 | 500 | 500 | 10 | 0 | Good | α Fe | ○ |
| Comparative Example 5 | 500 | 495 | 500 | 0 | 5 | Crack | Compound | × |
| Example 10 | 500 | 490 | 500 | 0 | 10 | Good | α Fe | ○ |
| Example 11 | 400 | 400 | 500 | 100 | 100 | Good | α Fe | ○ |
| Example 12 | 300 | 400 | 500 | 200 | 100 | Good | α Fe | ○ |
| Example 13 | 200 | 400 | 500 | 300 | 100 | Good | α Fe | ○ |
| Exemple 14 | 100 | 400 | 500 | 400 | 100 | Good | α Fe | ○ |
| Example 16 | 100 | 300 | 500 | 400 | 200 | Good | α Fe | ○ |
| Example 16 | 100 | 200 | 500 | 400 | 300 | Good | α Fe | ○ |

TABLE 1-continued

| | Lipper Punch (° C.) | Lower Punch (° C.) | Die (° C.) | Die/Upper Punch Temperature Difference (° C.) | Die/Lower Punch Temperature Difference (° C.) | Appearance Of Dust Core | Phase | Judgement |
|---|---|---|---|---|---|---|---|---|
| Example 17 | 100 | 100 | 500 | 400 | 400 | Good | α Fe | ○ |
| Comparative Example 8 | 430 | 430 | 430 | 0 | 0 | Crack | Compound | × |
| Comparative Example 7 | 425 | 430 | 430 | 5 | 0 | Crack | Compound | × |
| Comparative Example 8 | 430 | 425 | 430 | | 5 | Crack | Compound | × |
| Example 18 | 420 | 430 | 430 | 10 | | Good | α Fe | ○ |
| Example 19 | 430 | 420 | 430 | C | | Good | α Fe | ○ |
| Example 20 | 300 | 400 | 430 | 130 | 30 | Good | α Fe | ○ |
| Example 21 | 200 | 400 | 430 | 230 | 30 | Good | α Fe | ○ |
| Example 22 | 150 | 400 | 430 | 280 | 30 | Good | α Fe | ○ |
| Example 23 | 100 | 400 | 430 | 330 | 30 | Good | α Fe | ○ |
| Comparative Example 9 | 380 | 380 | 380 | 0 | 0 | Good | Not Crystallized | × |
| Example 24 | 350 | 440 | 520 | 170 | 80 | Good | α Fe | ○ |
| Example 25 | 300 | 420 | 520 | 220 | 100 | Good | α Fe | ○ |
| Example 26 | 340 | 430 | 500 | 160 | 70 | Good | α Fe | ○ |
| Comparative Example A1 | 520 | 515 | 520 | 0 | 5 | Crack | Compound | × |
| Comparative Example A2 | 520 | 520 | 515 | 5 | 5 | Crack | Compound | × |
| Comparative Example A3 | 520 | 515 | 515 | 5 | 0 | Crack | Compound | × |
| Comparative Example A4 | 515 | 520 | 515 | 0 | 5 | Crack | Compound | × |
| Comparative Example A5 | 515 | 515 | 520 | 5 | 5 | Crack | Compound | × |
| Example A1 | 520 | 510 | 520 | 0 | 10 | Good | α Fe | ○ |
| Example A2 | 520 | 520 | 510 | 10 | 10 | Good | α Fe | ○ |
| Example A3 | 520 | 510 | 510 | 10 | 0 | Good | α Fe | ○ |
| Example A4 | 510 | 520 | 510 | 0 | 10 | Good | α Fe | ○ |
| Example A6 | 510 | 510 | 520 | 10 | 10 | Good | α Fe | ○ |
| Example A6 | 520 | 400 | 520 | 0 | 120 | Good | α Fe | ○ |
| Example A7 | 520 | 520 | 400 | 120 | 120 | Good | α Fe | ○ |
| Example A8 | 520 | 400 | 400 | 120 | 0 | Good | α Fe | ○ |
| Example A9 | 400 | 520 | 400 | 0 | 120 | Good | α Fe | ○ |
| ExampleA10 | 400 | 400 | 520 | 120 | 120 | Good | α Fe | ○ |
| Comparative Example A6 | 500 | 500 | 495 | 5 | 5 | Crack | Compound | × |
| Example A11 | 500 | 500 | 490 | 10 | 10 | Good | α Fe | ○ |
| Example A12 | 500 | 400 | 100 | 100 | 0 | Good | α Fe | ○ |
| Example A13 | 400 | 500 | 400 | 0 | 100 | Good | α Fe | ○ |
| Example A14 | 500 | 500 | 400 | 100 | 100 | Good | α Fe | ○ |
| Example A15 | 500 | 400 | 500 | 0 | 100 | Good | α Fe | ○ |

The dust cores 600 of Examples 1 to 4, 6 to 9, 11 to 18, 20 to 26, A5 and A10 in Table 1 are manufactured by using the metal die 300 which is configured so that the temperature Tl of the upper punch 350 functioning as the low-temperature portion 400 is less than the temperature Th of the die 310, which functions as the high-temperature portion 500, by 10° C. or more. Table 1 shows as follows: each of the dust cores 600 of Example 1 to 4, 6 to 9, 11 to 18, 20 to 26, A5 and A10 has a good appearance; and each of the dust cores 600 of Example 1 to 4, 6 to 9, 11 to 18, 20 to 26, A5, A10 has good electromagnetic characteristics because the compound phase is not precipitated. The dust cores 600 of Examples 5, 10, 19, A1, A5, A6, A10 and A15 in Table 1 are manufactured by using the metal die 300 which is configured so that the temperature Tl of the lower punch 330 functioning as the low-temperature portion 400 is less than the temperature Th of the die 310, which functions as the high-temperature portion 500, by 10° C. or more. Table 1 shows as follows: each of the dust cores 600 of Examples 5, 10, 19, A1, A5, A6, A10 and A15 has a good appearance; and each of the dust cores 600 of Examples 5, 10, 19, A1, A5, A6, A10 and A15 has good electromagnetic characteristics because the compound phase is not precipitated. In contrast, dust cores of Comparative Examples 1 to 8 and A1 to A6 in Table 1 are manufactured under a condition where a temperature difference between the die 310 and any of the upper punch 350 and the lower punch 330 is less than 10° C. Table 1 shows as follows: each of the dust cores of Comparative Examples 1 to 8 and A1 to A6 has cracks on its surface; and each of the dust cores of Comparative Examples 1 to 8 and A1 to A6 has degraded electromagnetic characteristics because the compound phase is precipitated. A dust core of Comparative Example 9 in Table 1 is manufactured under a condition where a temperature difference between the die 310 and any of the upper punch 350 and the lower punch 330 is less than 10° C. Table 1 shows that, because the dust core of Comparative Example 9 is manufactured by being heated at a temperature less than the crystallization temperature Tc, the crystallization of αFe is not promoted in the dust core and thereby the dust core has degraded electromagnetic characteristics.

The dust cores 600 of Examples A2, A3, A7, A8, A11, A12 and A14 in Table 1 are manufactured by using the metal die 300 which is configured so that the temperature Th of the die 310 functioning as the low-temperature portion 400 is less than the temperature Tl of the upper punch 350, which functions as the high-temperature portion 500, by 10° C. or more. Table 1 shows as follows: each of the dust cores 600 of Example A2, A3, A7, A8, A11, A12 and A14 has a good appearance; and each of the dust cores 600 of Example A2, A3, A7, A8, A11, A12 and A14 has good electromagnetic characteristics because the compound phase is not precipitated. The dust cores 600 of Examples A2, A4, A7, A9, A11, A13 and A14 in Table 1 are manufactured by using the metal die 300 which is configured so that the temperature Th of the die 310 functioning as the low-temperature portion 400 is less than the temperature Tl of the lower punch 330, which functions as the high-temperature portion 500, by 10° C. or more. Table 1 shows as follows: each of the dust cores 600 of Examples A2, A4, A7, A9, A11, A13 and A14 has a good appearance; and each of the dust cores 600 of Examples A2, A4, A7, A9, A11, A13 and A14 has good electromagnetic characteristics because the compound phase is not precipitated.

A degree of crystallinity C1 of a first surface 620, a degree of crystallinity C2 of a second surface 640 and a degree of crystallinity C of a peripheral surface 660 of each of the dust cores 600 of Examples 1 to 26 and A1 to A15 were measured. Similarly, a degree of crystallinity of a first surface, a degree of crystallinity of a second surface and a degree of crystallinity of a peripheral surface of each of the dust cores of Comparative Examples 1 to 9 and A1 to A6 were measured. The measurement results are shown in Table 2 and Table 3.

TABLE 2

| | Degree of Crystallinity C1 Of First Surface (%) | Degree of Crystallinity C2 Of Second Surface (9%) | Degree of Crystallinity C Of Peripheral Surface (%) | Cmax (%) | Cmin (%) | Cmax-Cmin (%) | C-C1 (%) | C-C2 (%) |
|---|---|---|---|---|---|---|---|---|
| Comparative Example 1 | 51 | 51 | 51 | 51 | 51 | 0 | 0 | 0 |
| Comparative Example 2 | 51 | 51 | 51 | 51 | 51 | 0 | 0 | 0 |
| Example 1 | 50 | 51 | 51 | 51 | 50 | 1 | 1 | 0 |
| Example 2 | 40 | 51 | 51 | 51 | 40 | 11 | 11 | 0 |
| Example 3 | 25 | 51 | 51 | 51 | 25 | 28 | 26 | 0 |
| Example 4 | 20 | 51 | 51 | 51 | 20 | 31 | 31 | 0 |
| Exemple 5 | 51 | 40 | 51 | 51 | 40 | 11 | 0 | 11 |
| Example 6 | 39 | 40 | 51 | 51 | 39 | 12 | 12 | 11 |
| Example 7 | 24 | 40 | 51 | 51 | 24 | 27 | 27 | 11 |
| Example 8 | 19 | 40 | 51 | 51 | 19 | 32 | 32 | 11 |
| Comparative Example 3 | 50 | 50 | 50 | 50 | 50 | 0 | 0 | 0 |
| Comparative Example 4 | 50 | 50 | 50 | 50 | 50 | 0 | 0 | 0 |
| Example 9 | 49 | 50 | 50 | 50 | 49 | 1 | 1 | 0 |
| Comparative Example 5 | 50 | 50 | 50 | 50 | 50 | 0 | 0 | 0 |
| Example 10 | 50 | 45 | 50 | 50 | 49 | 1 | 0 | 1 |
| Example 11 | 38 | 38 | 50 | 50 | 38 | 12 | 12 | 12 |
| Exemple 12 | 36 | 38 | 50 | 50 | 36 | 14 | 14 | 12 |
| Example 13 | 21 | 38 | 50 | 50 | 21 | 29 | 29 | 12 |
| Example 14 | 19 | 38 | 50 | 50 | 19 | 31 | 31 | 12 |
| Example 15 | 19 | 36 | 50 | 50 | 19 | 31 | 31 | 14 |
| Example 16 | 19 | 21 | 50 | 50 | 19 | 31 | 31 | 29 |
| Exemple 17 | 19 | 19 | 50 | 50 | 19 | 31 | 31 | 31 |
| Comparative Example 6 | 46 | 40 | 40 | 40 | 40 | 0 | 0 | 0 |
| Comparative Example 7 | 40 | 40 | 40 | 40 | 40 | 0 | 0 | 0 |
| Comparative Example 8 | 40 | 40 | 40 | 40 | 40 | 0 | 0 | 0 |
| Example 18 | 39 | 4.0 | 40 | 40 | 39 | 1 | 1 | 0 |
| Exemple 19 | 40 | 39 | 40 | 40 | 39 | 1 | 0 | 1 |
| Example 20 | 36 | 38 | 40 | 40 | 36 | 4 | 4 | 2 |
| Example 21 | 21 | 38 | 40 | 40 | 21 | 19 | 19 | 2 |
| Example 22 | 20 | 38 | 40 | 40 | 20 | 20 | 20 | 2 |
| Example 23 | 19 | 38 | 40 | 40 | 19 | 21 | 21 | 2 |
| Comparative Example 9 | 0 | 0 | 0 | 0 | 0 | 0 | 0 | 0 |
| Example 24 | 41 | 43 | 51 | 51 | 41 | 10 | 10 | 8 |
| Example 25 | 39 | 41 | 51 | 51 | 35 | 12 | 12 | 10 |
| Example 26 | 37 | 39 | 50 | 50 | 37 | 13 | 13 | 11 |
| Comparative Example A1 | 51 | 51 | 51 | 51 | 51 | 0 | 0 | 0 |
| Comparative Example A5 | 51 | 51 | 51 | 51 | 51 | 0 | 0 | 0 |
| Example A1 | 51 | 50 | 51 | 51 | 50 | 1 | 0 | 1 |
| Example A6 | 50 | 50 | 51 | 51 | 50 | 1 | 1 | 1 |
| Example AS | 51 | 38 | 51 | 51 | 38 | 13 | 0 | 13 |
| Example A10 | 38 | 38 | 51 | 5 | 38 | 13 | 13 | 13 |
| Example A15 | 50 | 38 | 50 | 50 | 38 | 12 | 0 | 12 |

TABLE 3

| | Degree of Crystallinity C1 Of First Surface (%) | Degree of Crystallinity C2 Of Second Surface (9%) | Degree of Crystallinity C Of Peripheral Surface (%) | Cmax (%) | Cmin (%) | Cmax-Cmin (%) | C-C1 (%) | C-C2 (%) |
|---|---|---|---|---|---|---|---|---|
| Comparative Example A2 | 51 | 51 | 51 | 51 | 51 | 0 | 0 | 0 |
| Comparative Example A3 | 51 | 51 | 51 | 51 | 51 | 0 | 0 | 0 |
| Comparative Example A4 | 51 | 51 | 51 | 51 | 51 | 0 | 0 | 0 |
| Example A2 | 51 | 51 | 50 | 51 | 50 | 1 | 1 | 0 |
| Example A3 | 51 | 50 | 50 | 51 | 50 | 1 | 1 | 0 |
| Example A4 | 50 | 51 | 50 | 51 | 50 | 1 | 0 | 1 |
| Example A7 | 51 | 51 | 38 | 51 | 38 | 13 | 13 | 13 |
| Example A8 | 51 | 38 | 30 | 51 | 38 | 13 | 13 | 0 |
| Example A9 | 38 | 51 | 38 | 51 | 30 | 13 | 0 | 13 |
| Comparative Example A6 | 50 | 50 | 50 | 50 | 50 | 0 | 0 | 0 |
| Example A11 | 50 | 50 | 49 | 50 | 49 | 1 | 1 | 1 |
| Example A12 | 50 | 38 | 38 | 50 | 38 | 12 | 12 | 0 |
| Example A13 | 38 | 50 | 38 | 50 | 38 | 12 | 0 | 12 |
| Example A14 | 50 | 50 | 38 | 50 | 38 | 12 | 12 | 12 |

Table 1, Table 2 and Table 3 show that each of the degree of crystallinity C1 of the first surface 620, the degree of crystallinity C2 of the second surface 640 and the degree of crystallinity C of the peripheral surface 660 is increased as its heating temperature is increased. In addition, Table 1, Table 2 and Table 3 show that a difference between the degree of crystallinity C of the peripheral surface 660 and the degree of crystallinity C1 of the first surface 620 is increased as a difference between the heating temperature of the peripheral surface 660 and the heating temperature of the first surface 620 is increased. Similarly, Table 1, Table 2 and Table 3 show that a difference between the degree of crystallinity C of the peripheral surface 660 and the degree of crystallinity C2 of the second surface 640 is increased as a difference between the heating temperature of the peripheral surface 660 and the heating temperature of the second surface 640 is increased. In Example 1 in which the difference between the heating temperature (520° C.) of the peripheral surface 660 and the heating temperature (510° C.) of the first surface 620 is 10° C., the difference between the degree of crystallinity C (51%) of the peripheral surface 660 and the degree of crystallinity C1 (50%) of the first surface 620 is 1%. In Example 10 in which the difference between the heating temperature (500° C.) of the peripheral surface 660 and the heating temperature (490° C.) of the second surface 640 is 10° C., the difference between the degree of crystallinity C (50%) of the peripheral surface 660 and the degree of crystallinity C2 (49%) of the second surface 640 is 1%. In Example A1, A5 in which the difference between the heating temperature (520° C.) of the peripheral surface 660 and the heating temperature (510° C.) of the second surface 640 is 10° C., the difference between the degree of crystallinity C (51%) of the peripheral surface 660 and the degree of crystallinity C2 (50%) of the second surface 640 is 1%. In Example A2, A3 in which the difference between the heating temperature (510° C.) of the peripheral surface 660 and the heating temperature (520° C.) of the first surface 620 is 10° C., the difference between the degree of crystallinity C (50%) of the peripheral surface 660 and the degree of crystallinity C2 (51%) of the first surface 620 is 1%. In Example A4 in which the difference between the heating temperature (510° C.) of the peripheral surface 660 and the heating temperature (520° C.) of the second surface 640 is 10° C., the difference between the degree of crystallinity C (50%) of the peripheral surface 660 and the degree of crystallinity C2 (51%) of the second surface 640 is 1%. In Example A11 in which the difference between the heating temperature (490° C.) of the peripheral surface 660 and the heating temperature (500° C.) of the first surface 620 is 10° C., the difference between the degree of crystallinity C (49%) of the peripheral surface 660 and the degree of crystallinity C1 (50%) of the first surface 620 is 1%. These results teach that the manufacturing method of the present embodiment can manufacture the dust core 600 which is configured so that the difference between the maximum value among the degree of crystallinity C1 of the first surface 620, the degree of crystallinity C2 of the second surface 640 and the degree of crystallinity C of the peripheral surface 660, namely, max(C1, C2, C), and the minimum value among the degree of crystallinity C1 of the first surface 620, the degree of crystallinity C2 of the second surface 640 and the degree of crystallinity C of the peripheral surface 660, namely, min(C1, C2, C), is 1% or more. Additionally, these results teach that, if a dust core, whose manufacturing method is unknown, is configured so that a difference between the maximum value (max(C1, C2, C)) among a degree of crystallinity C1 of a first surface 620, a degree of crystallinity C2 of a second surface 640 and a degree of crystallinity C of a peripheral surface 660 and the minimum value (min(C1, C2, C)) among the degree of crystallinity C1 of the first surface 620, the degree of crystallinity C2 of the second surface 640 and the degree of crystallinity C of the peripheral surface 660 is 1% or more, the dust core can be presumed to be a dust core 600 manufactured by the manufacturing method of the present invention. It is noted that, in Examples 1 to 26, the maximum value (max(C1, C2, C)) among the degree of crystallinity C1 of the first surface 620, the degree of crystallinity C2 of the second surface 640 and the degree of crystallinity C of the peripheral surface 660 is the degree of crystallinity C of the peripheral surface 660. That is, in Examples 1 to 26, max(C1, C2, C)=C.

Examples 27 to 40 and A16 to A23 and Comparative Examples 10 to 15 and A7 to A14

Metallic glass particles made of $Fe_{77.1}B_{14.4}P_{5.5}Cr_1Nb_2$ (at %) are used as magnetic particles 100A. The magnetic particles 100A are coated with insulative coating material 110A by mixing the insulative coating material 110A, which is a material based on $P_2O_5$—ZnO—$R_2O$, with the magnetic particles 100A to form a compound so that the content of the insulative coating material 110A is 1.0 wt % by weight of the compound. A mixture is made by mixing the magnetic particles 100A, which are coated with the insulative coating material 110A, with phenolic resin as a binder so that the content of the binder is 0.4 wt % by weight of the mixture. The mixture (weight: 37 g) is filled in the metal die 300, and is heated at temperatures shown in below table 4 and compacted at a molding pressure of 8 t/$cm^2$, and a dust core, which has a length of 55.69 mm, a width of 23 mm and a thickness of 4.5 mm, is manufactured. It is noted that the metallic glass particles made of $Fe_{77.1}B_{14.4}P_{5.5}Cr_1Nb_2$ has a glass transition temperature Tg of 484° C. The metallic glass particles made of $Fe_{77.1}B_{14.4}P_{5.5}Cr_1Nb_2$ has a crystallization temperature of 511° C. Evaluation results of the manufactured dust cores are shown in Table 4.

The dust cores 600A of Examples 27 to 29, 33 to 35, 39, 40, A19 and A23 in Table 4 are manufactured by using the metal die 300 which is configured so that the temperature Tl of the upper punch 350 functioning as the low-temperature portion 400 is less than the temperature Th of the die 310, which functions as the high-temperature portion 500, by 1000 or more. Table 4 shows as follows: each of the dust cores 600A of Examples 27 to 29, 33 to 35, 39, 40, A19 and A23 has a good appearance; and each of the dust cores 600 of Examples 27 to 29, 33 to 35, 39, 40, A19 and A23 has good electromagnetic characteristics because the compound phase is not precipitated. The dust cores 600A of Examples 30 to 32, 36 to 38, A19 and A23 in Table 4 are manufactured by using the metal die 300 which is configured so that the temperature Tl of the lower punch 330 functioning as the low-temperature portion 400 is less than the temperature Th of the die 310, which functions as the high-temperature

TABLE 4

| | Upper Punch (° C.) | Lower Punch (° C.) | Die (° C.) | Die/Upper Punch Temperature Difference (° C.) | Die/Lower Punch Temperature Difference (° C.) | Appearance Judgement Of Dust Core | Judgement |
|---|---|---|---|---|---|---|---|
| Comparative Example 10 | 500 | 500 | 500 | 0 | 0 | Crack | × |
| Comparative Example 11 | 495 | 500 | 500 | 5 | 0 | Crack | × |
| Example 27 | 490 | 500 | 500 | 10 | 0 | Good | ○ |
| Example 28 | 450 | 500 | 500 | 50 | 0 | Good | ○ |
| Example 29 | 300 | 500 | 500 | 200 | 0 | Good | ○ |
| Comparative Example 12 | 500 | 495 | 500 | 0 | 5 | Crack | × |
| Example 30 | 500 | 490 | 500 | 0 | 10 | Good | ○ |
| Example 31 | 500 | 450 | 500 | 0 | 50 | Good | ○ |
| Example 32 | 500 | 300 | 500 | 0 | 200 | Good | ○ |
| Comparative Example 13 | 430 | 430 | 430 | 0 | 0 | Crack | × |
| Comparative Example 14 | 425 | 430 | 430 | 5 | 0 | Crack | × |
| Example 33 | 420 | 430 | 430 | 10 | 0 | Good | ○ |
| Example 34 | 380 | 430 | 430 | 50 | 0 | Gooo | ○ |
| Example 35 | 230 | 430 | 430 | 200 | 0 | Good | ○ |
| Comparative Example 15 | 430 | 425 | 430 | 0 | 5 | Crack | × |
| Example 36 | 430 | 420 | 430 | 0 | 10 | Good | ○ |
| Example 37 | 430 | 380 | 430 | 0 | 50 | Good | ○ |
| Example 38 | 430 | 230 | 430 | 0 | 200 | Good | ○ |
| Example 39 | 350 | 440 | 520 | 170 | 80 | Good | ○ |
| Example 40 | 340 | 430 | 500 | 160 | 70 | Good | ○ |
| Comparative Example A7 | 500 | 500 | 495 | 5 | 5 | Crack | × |
| Comparative Example A8 | 500 | 495 | 495 | 5 | 0 | Crack | × |
| Comparative Example A9 | 495 | 500 | 495 | 0 | 5 | Crack | × |
| Comparative Example A10 | 495 | 495 | 500 | 5 | 5 | Crack | × |
| Example A16 | 500 | 500 | 490 | 10 | 10 | Good | ○ |
| Example A17 | 500 | 430 | 490 | 10 | 0 | Good | ○ |
| Example A18 | 490 | 500 | 490 | 0 | 10 | Good | ○ |
| Example A19 | 490 | 490 | 500 | 10 | 10 | Good | ○ |
| Comparative Example A11 | 430 | 430 | 425 | 5 | 5 | Crack | × |
| Comparative Example A12 | 430 | 425 | 425 | 5 | 0 | Crack | × |
| Comparative Example A13 | 425 | 430 | 425 | 0 | 5 | Crack | × |
| Comparative Example A14 | 425 | 425 | 430 | 5 | 5 | Crack | × |
| Example A20 | 430 | 430 | 420 | 10 | 10 | Good | ○ |
| Example A21 | 430 | 420 | 420 | 10 | 0 | Good | ○ |
| Example A22 | 420 | 430 | 420 | 0 | 10 | Good | ○ |
| Example A23 | 420 | 420 | 430 | 10 | 10 | Good | ○ |

portion 500, by 10° C. or more. Table 4 shows as follows: each of the dust cores 600A of Examples 30 to 32, 36 to 38, A19 and A23 has a good appearance; and each of the dust cores 600A of Examples 30 to 32, 36 to 38, A19 and A23 has good electromagnetic characteristics because the compound phase is not precipitated. In contrast, dust cores of Comparative Examples 10 to 15 and A7 to A14 in Table 4 are manufactured under a condition where a temperature difference between the die 310 and any of the upper punch 350 and the lower punch 330 is less than 10° C. Table 4 shows that each of the dust cores of Comparative Examples 10 to 15 and A7 to A14 has cracks on its surface.

The dust cores 600A of Examples A16, A17, A20 and A21 in Table 4 are manufactured by using the metal die 300 which is configured so that the temperature Th of the die 310 functioning as the low-temperature portion 400 is less than the temperature Tl of the upper punch 350, which functions as the high-temperature portion 500, by 10° C. or more. Table 4 shows as follows: each of the dust cores 600A of Examples A16, A17, A20 and A21 has a good appearance; and each of the dust cores 600A of Examples A16, A17, A20 and A21 has good electromagnetic characteristics because the compound phase is not precipitated. The dust cores 600A of Examples A16, A18, A20 and A22 in Table 4 are manufactured by using the metal die 300 which is configured so that the temperature Th of the die 310 functioning as the low-temperature portion 400 is less than the temperature Tl of the lower punch 330, which functions as the high-temperature portion 500, by 10° C. or more. Table 4 shows as follows: each of the dust cores 600A of Examples A16, A18, A20 and A22 has a good appearance; and each of the dust cores 600A of Examples A16, A18, A20 and A22 has good electromagnetic characteristics because the compound phase is not precipitated.

A surface resistance R1 of a first surface 620A, a surface resistance R2 of a second surface 640A and a surface resistance R of a peripheral surface 660A of each of the dust cores 600A of Examples 27 to 40 and A16 to A23 were measured. Similarly, a surface resistance of a first surface, a surface resistance of a second surface and a surface resistance of a peripheral surface of each of dust cores of Comparative Examples 10 to 15, A7 to A14 were measured. The measurement results are shown in Table 5 and Table 6.

TABLE 5

| | Surface Resistance R1 Of First Surface (Ω) | Surface Resistance R2 Of Second Surface (Ω) | Surface Resistance R Of Peripheral Surface (Ω) | Rmax (Ω) | Rmin (Ω) | Rmin/ Rmax | R1/R | R2/R |
|---|---|---|---|---|---|---|---|---|
| Comparative Example 10 | $1.0*10^{6}$ | $1.0*10^{6}$ | $1.0*10^{6}$ | $1.0*10^{6}$ | $1.0*10^{6}$ | 1.00 | 1.00 | 1.00 |
| Comparative Example 11 | $9\ 9*10^{5}$ | $1.0*10^{6}$ | $1.0*10^{6}$ | $1.0*10^{6}$ | $9.9*10^{5}$ | 0.99 | 0.99 | 1.00 |
| Example 27 | $9.5*10^{5}$ | $9.9*10^{5}$ | $1.0*10^{5}$ | $1.0*10^{6}$ | $9.5*10^{5}$ | 0.95 | 0.95 | 0.99 |
| Example 28 | $5.3*10^{5}$ | $1.1*10^{6}$ | $9.9*10^{6}$ | $1.1*10^{6}$ | $5.3*10^{5}$ | 0.48 | 0.54 | 1.11 |
| Example 29 | 32 | $1.0*10^{6}$ | $1.1*10^{6}$ | $1.1*10^{6}$ | 32 | <0.01 | <0.01 | 0.91 |
| Comparative Example 12 | $1.0*10^{6}$ | $9.7*10^{5}$ | $1.0*10^{6}$ | $1.0*10^{6}$ | $9.7*10^{5}$ | 0.97 | 1.00 | 0.97 |
| Example 30 | $1.0*10^{6}$ | $9.5*10^{5}$ | $1.0*10^{6}$ | $1.0*10^{6}$ | $9.5*10^{5}$ | 0.95 | 1.00 | 0.95 |
| Example 31 | $9.9*10^{5}$ | $5.3*10^{5}$ | $1.0*10^{6}$ | $1.0*10^{6}$ | $5.3*10^{5}$ | 0.53 | 0.99 | 0.53 |
| Example 32 | $1.0*10^{6}$ | 31 | $1.1*10^{6}$ | $1.1*10^{6}$ | 31 | <0.01 | 0.91 | <0.01 |
| Comparative Example 13 | $3.8*10^{5}$ | $3.7*10^{5}$ | $3.8*10^{5}$ | $3.8*10^{5}$ | $3.7*10^{5}$ | 0.97 | 1.00 | 0.97 |
| Comparative Example 14 | $3.7*10^{5}$ | $3.8*10^{5}$ | $3.8*10^{5}$ | $3.8*10^{5}$ | $3.7*10^{5}$ | 0.97 | 0.97 | 1.00 |
| Example 33 | $3.1*10^{5}$ | $3.8*10^{5}$ | $3.8*10^{5}$ | $3.8*10^{5}$ | $3.1*10^{5}$ | 0.82 | 0.82 | 1.00 |
| Example 34 | $1.2*10^{3}$ | $3.7*10^{5}$ | $3.8*10^{5}$ | $3.8*10^{5}$ | $1.2*10^{3}$ | <0.01 | <0.01 | 0.97 |
| Example 35 | 30 | $3.8*10^{5}$ | $3.7*10^{5}$ | $3.8*10^{5}$ | 30 | <0.01 | <0.01 | 1.03 |
| Comparative Example 15 | $3.7*10^{5}$ | $3.7*10^{5}$ | $3.8*10^{5}$ | $3\ 8*10^{5}$ | $3.7*10^{5}$ | 0.97 | 0.97 | 0.97 |
| Example 36 | $3.8*10^{5}$ | $3.1*10^{5}$ | $3.8*10^{5}$ | $3.8*10^{5}$ | $3.1*10^{5}$ | 0.82 | 1.00 | 0.82 |
| Example 37 | $3.7*10^{5}$ | $9.8*10^{4}$ | $3.9*10^{5}$ | $3.9*10^{5}$ | $9.8*10^{4}$ | 0.25 | 0.95 | 0.25 |
| Example 38 | $3.7*10^{5}$ | $1.8*10^{5}$ | $3.8*10^{5}$ | $3\ 8*10^{5}$ | $1.8*10^{5}$ | 0.47 | 0.97 | 0.47 |
| Example 39 | 60 | $4.5*10^{5}$ | $1.3*10^{6}$ | $1.3*10^{6}$ | 60 | <0.01 | <0.01 | 0.35 |
| Example 40 | 33 | $4.0*10^{5}$ | $9.9*10^{5}$ | $9.9*10^{5}$ | 33 | <0.01 | <0.01 | 0.40 |
| Comparative Example A10 | $9.8*10^{5}$ | $9.9*10^{5}$ | $1.0*10^{6}$ | $1\ 0*10^{6}$ | $9.8*10^{6}$ | 0.98 | 0.98 | 0.99 |
| Example Als | $9.4*10^{5}$ | $9.5*10^{5}$ | $1.0*10^{6}$ | $1.0*10^{6}$ | $9.4*10^{6}$ | 0.94 | 0.94 | 0.95 |
| Comparative Example A14 | $3.7*10^{5}$ | $3.7*10^{5}$ | $3.8*10^{5}$ | $3.8*10^{5}$ | $3.7*10^{5}$ | 0 97 | 0.97 | 0.97 |
| Example A23 | $3.1*10^{5}$ | $3.0*10^{5}$ | $3.8*10^{5}$ | $3.8*10^{5}$ | $3.0*10^{5}$ | 0.79 | 0.82 | 0.79 |

TABLE 6

| | Surface Resistance R1 Of First Surface (Ω) | Surface Resistance R2 Of Second Surface (Ω) | Surface Resistance R Of Peripheral Surface (Ω) | Rmax (Ω) | Rmin (Ω) | Rmin/ Rmax | R/R1 | R/R2 |
|---|---|---|---|---|---|---|---|---|
| Comparative Example A7 | $1.0*10^{6}$ | $1.0*10^{6}$ | $9.9*10^{5}$ | $1.0*10^{6}$ | $9.9*10^{5}$ | 0.99 | 0.99 | 0.99 |
| Comparative Example A8 | $1.0*10^{6}$ | $9.8*10^{5}$ | $9.9*10^{5}$ | $1.0*10^{6}$ | $9.8*10^{5}$ | 0.98 | 0.99 | 1.01 |
| Comparative Example A9 | $9.9*10^{6}$ | $1.0*10^{6}$ | $9.7*10^{5}$ | $1.0*10^{6}$ | $9.7*10^{5}$ | 0.97 | 0.98 | 0.97 |
| Example A16 | $1.0*10^{6}$ | $1.0*10^{6}$ | $9.5*10^{5}$ | $1.0*10^{6}$ | $9.5*10^{5}$ | 0.95 | 0.95 | 0.95 |
| Example A17 | $1.0*10^{6}$ | $9.4*10^{5}$ | $9.5*10^{5}$ | $1.0*10^{6}$ | $9.4*10^{5}$ | 0.94 | 0.95 | 1.01 |
| Example A18 | $9.5*10^{5}$ | $1.0*10^{5}$ | $9.3*10^{5}$ | $1.0*10^{6}$ | $9.3*10^{5}$ | 0.93 | 0.98 | 0.93 |
| Comparative Example A11 | $3.8*10^{5}$ | $3.7*10^{5}$ | $3.7*10^{5}$ | $3.8*10^{5}$ | $3.7*10^{5}$ | 0.97 | 097 | 1.00 |

TABLE 6-continued

| | Surface Resistance R1 Of First Surface (Ω) | Surface Resistance R2 Of Second Surface (Ω) | Surface Resistance R Of Peripheral Surface (Ω) | Rmax (Ω) | Rmin (Ω) | Rmin/ Rmax | R/R1 | R/R2 |
|---|---|---|---|---|---|---|---|---|
| Comparative Example A12 | $3.8*10^5$ | $3.7*10^5$ | $3.7*10^5$ | $3.8*10^5$ | $3.7*10^5$ | 0.97 | 0.97 | 1.00 |
| Comparative Example A13 | $3.7*10^5$ | $3.8*10^5$ | $3.7*10^5$ | $3.8*10^5$ | $3.7*10^5$ | 0.97 | 1.00 | 0.97 |
| Example AZ0 | $3.8*10^5$ | $3.8*10^5$ | $3.1*10^5$ | $3.8*10^5$ | $3.1*10^5$ | 0.82 | 0.82 | 0.82 |
| Example A21 | $3.8*10^5$ | $3.1*10^5$ | $3.1*10^5$ | $3.8*10^5$ | $3.1*10^5$ | 0.82 | 0.82 | 1.00 |
| Example A22 | $3.2*10^5$ | $3\ 7*10^5$ | $3.1*10^5$ | $3.7*10^5$ | $3.1*10^5$ | 0.84 | 0.97 | 0.84 |

Table 4, Table 5 and Table 6 show that each of the surface resistance R1 of the first surface 620A, the surface resistance R2 of the second surface 640A and the surface resistance R of the peripheral surface 660A is increased as its heating temperature is increased. In addition, Table 4, Table 5 and Table 6 show that a ratio the surface resistance R1 of the first surface 620A relative to the surface resistance R of the peripheral surface 660A is decreased as a difference between the heating temperature of the peripheral surface 660A and the heating temperature of the first surface 620A is increased. Similarly, Table 4, Table 5 and Table 6 show that a ratio the surface resistance R2 of the second surface 640A relative to the surface resistance R of the peripheral surface 660A is decreased as a difference between the heating temperature of the peripheral surface 660A and the heating temperature of the second surface 640A is increased. In Example 27 in which the difference between the heating temperature (500° C.) of the peripheral surface 660A and the heating temperature (490° C.) of the first surface 620A is 10° C., the ratio of the surface resistance R1 ($9.5*10^5$Ω) of the first surface 620A relative to the surface resistance R ($1.0*10^6$Ω) of the peripheral surface 660A is 0.95. In Example 30 in which the difference between the heating temperature (500° C.) of the peripheral surface 660A and the heating temperature (490° C.) of the second surface 640A is 10° C., the ratio of the surface resistance R2 ($9.5*10^5$Ω) of the second surface 640A relative to the surface resistance R ($1.0*10^6$Ω) of the peripheral surface 660A is 0.95. In Example A17 in which the difference between the heating temperature (490° C.) of the peripheral surface 660A and the heating temperature (500° C.) of the first surface 620A is 10° C., the ratio of the surface resistance R ($9.5*10^5$Ω) of the peripheral surface 660A relative to the surface resistance R1 ($1.0*10^6$Ω) of the first surface 620A is 0.95. In Example A18 in which the difference between the heating temperature (490° C.) of the peripheral surface 660A and the heating temperature (500° C.) of the second surface 640A is 10° C., the ratio of the surface resistance R ($9.3*10^5$Ω) of the peripheral surface 660A relative to the surface resistance R2 ($1.0*10^6$Ω) of the second surface 640A is 0.93. In Example A21 in which the difference between the heating temperature (420° C.) of the peripheral surface 660A and the heating temperature (430° C.) of the first surface 620A is 10° C., the ratio of the surface resistance R ($3.1*10^5$Ω) of the peripheral surface 660A relative to the surface resistance R1 ($3.8*10^5$Ω) of the first surface 620A is 0.82. In Example A22 in which the difference between the heating temperature (420° C.) of the peripheral surface 660A and the heating temperature (430° C.) of the second surface 640A is 10° C., the ratio of the surface resistance R ($3.1*10^5$Ω) of the peripheral surface 660A relative to the surface resistance R2 ($3.7*10^5$Ω) of the second surface 640A is 0.84. These results teach that the manufacturing method of the present embodiment can manufacture the dust core 600A which is configured so that a ratio of the minimum value among the surface resistance R1 of the first surface 620A, the surface resistance R2 of the second surface 640A and the surface resistance R of the peripheral surface 660A, namely, min(R1, R2, R), relative to the maximum value among the surface resistance R1 of the first surface 620A, the surface resistance R2 of the second surface 640A and the surface resistance R of the peripheral surface 660A, namely, max(R1, R2, R), is 0.95 or less. Additionally, these results teach that, if a dust core, whose manufacturing method is unknown, is configured so that a ration of the minimum value (min(R1, R2, R)) among a surface resistance R1 of a first surface 620A, a surface resistance R2 of a second surface 640A and a surface resistance R of a peripheral surface 660A relative to the maximum value (max(R1, R2, R)) among the surface resistance R1 of the first surface 620A, the surface resistance R2 of the second surface 640A and the surface resistance R of the peripheral surface 660A is 0.95 or less, the dust core can be presumed to be a dust core 600A manufactured by the manufacturing method of the present invention. It is noted that, in Examples 27, 29 to 34 and 36 to 40, the maximum value (max(R1, R2, R)) among the surface resistance R1 of the first surface 620A, the surface resistance R2 of the second surface 640A and the surface resistance R of the peripheral surface 660A is the surface resistance R of the peripheral surface 660A. That is, in Examples 27, 29 to 34 and 36 to 40, max(R1, R2, R)=R.

Although the specific explanation about the present invention is made above referring to the embodiments, the present invention is not limited thereto but susceptible of various modifications and alternative forms.

The present application is based on a Japanese patent applications of JP2020-164976 filed before the Japan Patent Office on Sep. 30, 2020, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST

100,100A magnetic particles
110,110A coating material
300,300B metal die
310 die
312 inner wall
314 accommodating portion
316 first opening
318 second opening
330 lower punch
350, 350B upper punch

352B low-temperature member

356B high-temperature member

400, 400B low-temperature portion

500 high-temperature portion

520 additional high-temperature portion

540 auxiliary high-temperature portion

600, 600A dust core

620, 620A first surface

640, 640A second surface

660, 660A peripheral surface

The invention claimed is:

1. A dust core including magnetic particles at least some of which are coated with coating material, wherein:

the magnetic particles include nanocrystals;

the dust core has a first surface, a second surface and a peripheral surface;

the first surface faces in a first orientation of a predetermined direction;

the second surface faces in a second orientation opposite to the first orientation;

the peripheral surface intersects with a perpendicular direction perpendicular to the predetermined direction; and $\max(C1, C2, C)-\min(C1, C2, C)\geq 1$, where, C1 is a degree of crystallinity of the first surface, C2 is a degree of crystallinity of the second surface, and C is a degree of crystallinity of the peripheral surface.

2. The dust core as recited in claim 1, wherein $\max(C1, C2, C)=C$.

* * * * *